INVENTORS
VERNON C. MELLIFF, JR.
WILLIAM T. WRIGHT
BY Roger W. Jensen
ATTORNEY

Dec. 26, 1961  V. C. MELLIFF, JR., ET AL  3,014,677
AIRCRAFT NAVIGATION CONTROL
Filed June 19, 1957  8 Sheets-Sheet 2

INVENTORS
VERNON C. MELLIFF, JR.
WILLIAM T. WRIGHT
BY
Roger W. Jensen
ATTORNEY

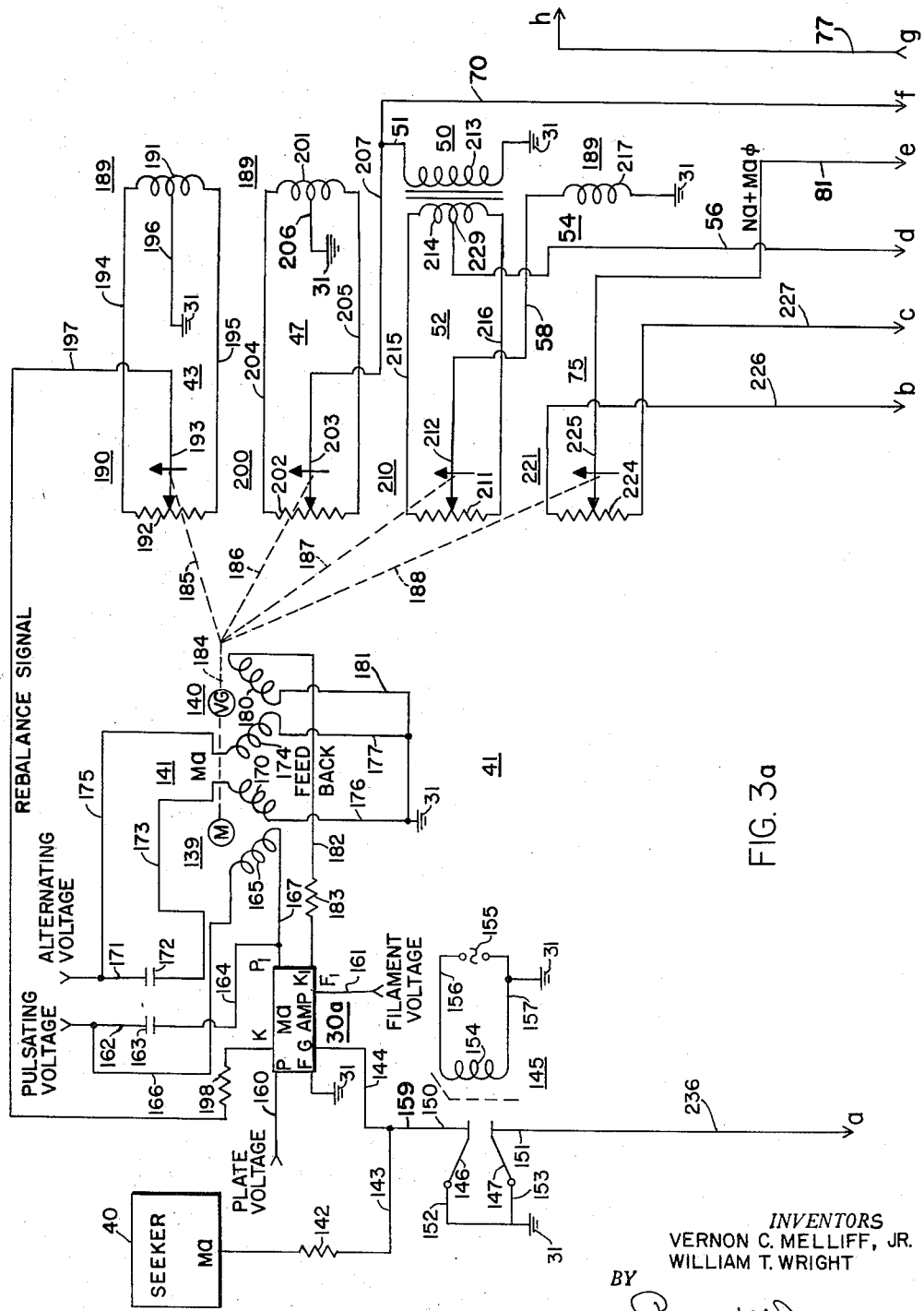

Dec. 26, 1961  V. C. MELLIFF, JR., ET AL  3,014,677
AIRCRAFT NAVIGATION CONTROL
Filed June 19, 1957  8 Sheets-Sheet 4

INVENTORS
VERNON C. MELLIFF, JR.
WILLIAM T. WRIGHT
BY
Roger W. Jensen
ATTORNEY

Dec. 26, 1961  V. C. MELLIFF, JR., ET AL  3,014,677
AIRCRAFT NAVIGATION CONTROL
Filed June 19, 1957  8 Sheets-Sheet 5

INVENTORS
VERNON C. MELLIFF, JR.
WILLIAM T. WRIGHT
BY
Roger W. Jensen
ATTORNEY

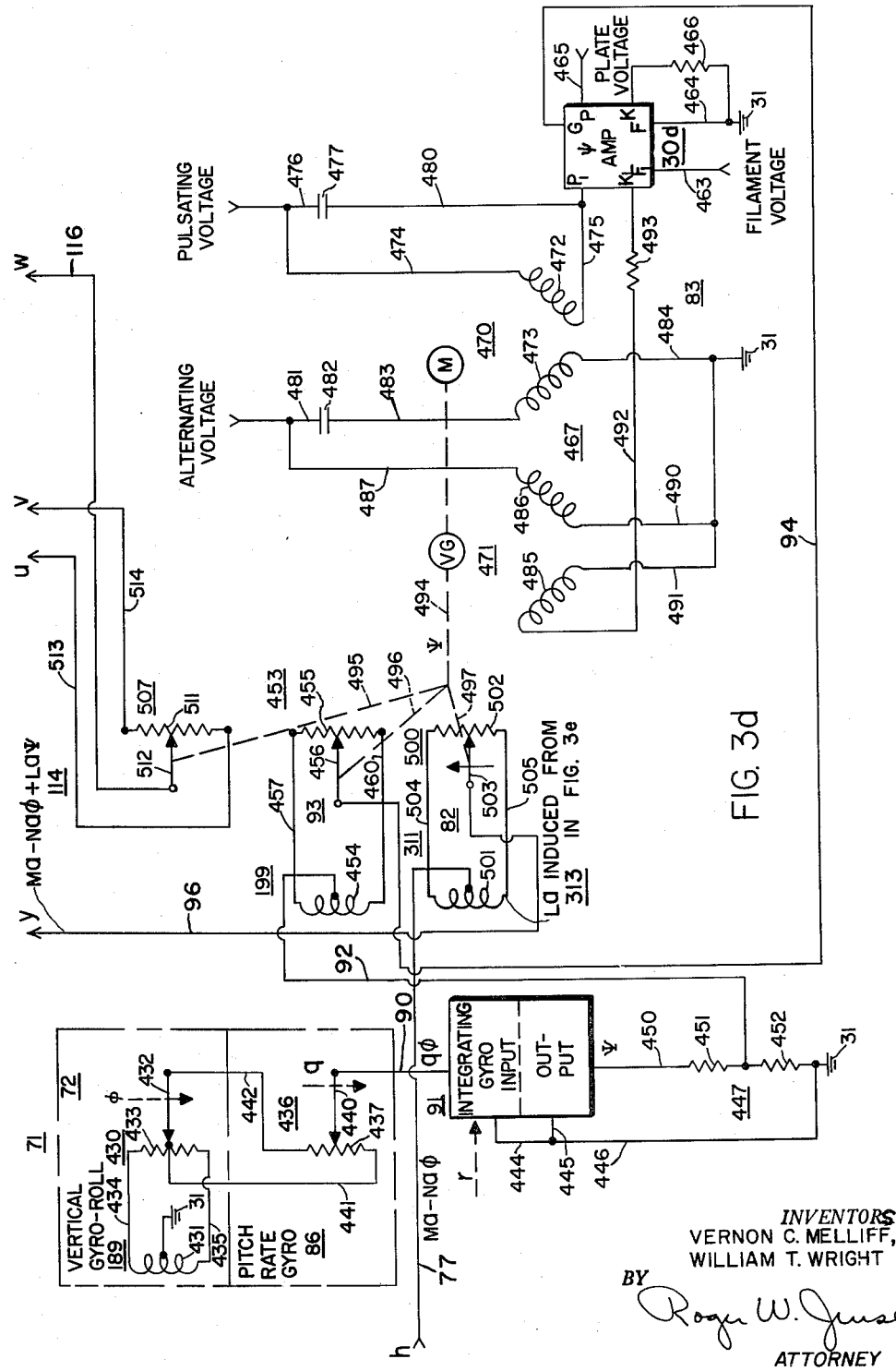

INVENTORS
VERNON C. MELLIFF, JR.
WILLIAM T. WRIGHT
BY
ATTORNEY

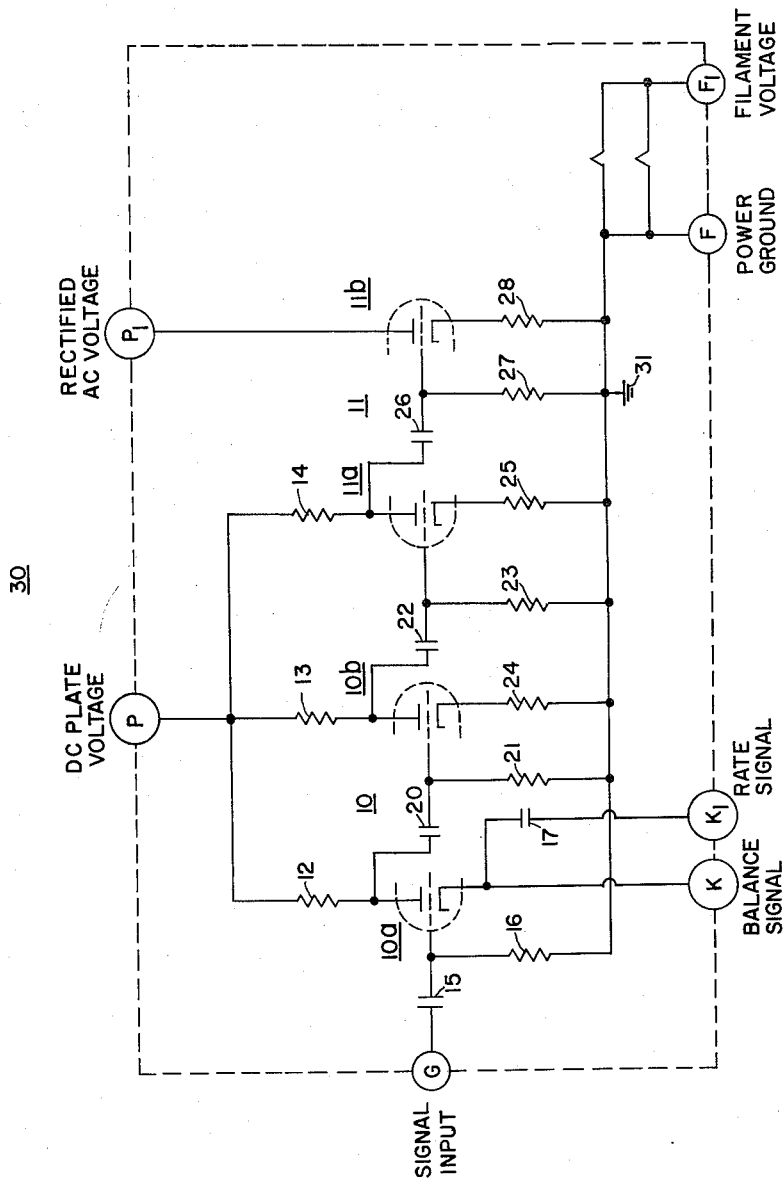

United States Patent Office 3,014,677
Patented Dec. 26, 1961

3,014,677
AIRCRAFT NAVIGATION CONTROL
Vernon C. Melliff, Jr., Houston, Tex., and William T. Wright, Los Angeles, Calif., assignors to Minneapolis-Honeywell Regulator Company, Minneapolis, Minn., a corporation of Delaware
Filed June 19, 1957, Ser. No. 666,566
14 Claims. (Cl. 244—77)

This invention relates to the field of aircraft controls and more particularly to an automatic coupler for coupling a radar receiver or guidance unit to an aircraft autopilot.

Automatic homing systems for dirigible craft commonly include radar receiving apparatus having signal outputs which are used to control an automatic pilot thus causing the dirigible craft to follow a radar signal towards the source of such a signal. This type of signal is commonly called a beacon signal and is intermittently received at the dirigible craft since the transmitter generally has a rotating antenna system. In most systems employing a receiver on the dirigible craft, a rotating antenna is used to receive the transmitted signals. Generally, a system such as just described allows the aircraft to be steered in azimuth only, since the radar beam has a beam width considerably more narrow than the depth of the beam.

The radar receiver used in the present invention utilizes four fixed antennas rather than an earth stabilized antenna or antenna referenced to an earth system of coordinates. A first pair of the antennas are spaced along the vertical or yaw axis of the aircraft, and are used to measure a pitch angle, and a second pair of the antennas are spaced, at right angles to the yaw axis, along the pitch axis or along the wings. If the two antennas of a pair are not on a line perpendicular to the direction of propagation of the transmitted signal or wave pattern, one antenna receives the signal sooner than the other, because it is closer to the source of radiation and a difference in phase exists between the two received signals. By knowing the spacing between the two antennas, this phase difference may be converted to a signal which is a function of the angle by which the line joining the antennas deviates from perpendicularity to the line from the aircraft to the transmitter antenna.

A signal such as just described is generally known as a direction cosine signal, and is referred to the set of rectangular aircraft coordinates. To completely define the location of an object or signal transmitter such as just described, a system of three direction cosines is generally used. However, if two of the three direction cosines are known, the magnitude of the third direction cosine may be computed therefrom, thus avoiding the necessity of providing a third pair of antennas and the cooperating circuits.

The present invention includes means for computing a third direction cosine from the two supplied by the radio equipment, and for transforming these three direction cosines, which are referenced to the airframe to three direction cosines with respect to the earth. For mechanization of the computer, it is convenient to use the negative of the latter described direction cosines, namely, the direction cosines which specify the direction of the vector from the aircraft to the signal transmitter rather than from the signal transmitter to the aircraft. The earth referenced signals may be used as autopilot input signals to automatically guide an aircraft.

It is a general object of the present invention to provide a computer which will compute an approximation of a third direction cosine from two others.

Another object of the present invention is to provide a computer to transform a system of coordinates referenced to an aircraft into a system of coordinates referenced to the earth.

Still another object of the present invention is to provide an improved coupler which will automatically couple an aircraft autopilot to an airborne seeker or signal receiver.

A further object of this invention is to provide a coupler which utilizes the rotational displacement of a vector from the aircraft to the signal transmitter rather than the angular rate of the vector from the aircraft to the signal transmitter.

These and other features of the invention will be understood more clearly from a following detailed description and accompanying drawings in which:

FIGURE 3a is a schematic diagram showing a portion of the computer which operates on an input signal $M_a$;

FIGURE 3d is a schematic digram showing a portion of the computer which computes an aircraft heading term $\psi$;

Figure 1:
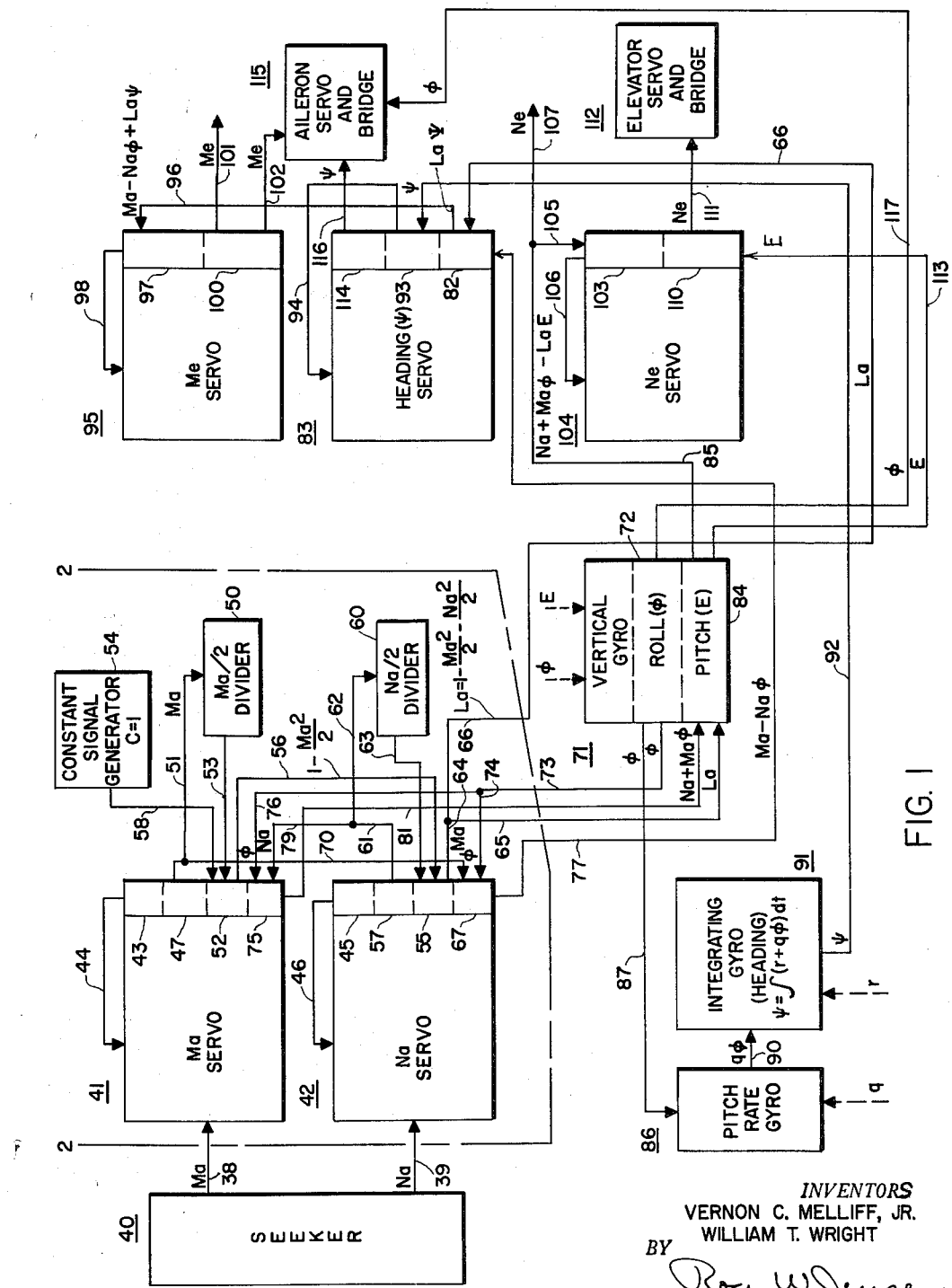
FIGURE 1 is a block diagram showing a coupler connecting the seeker unit to the autopilot.

Referring first to FIGURE 4, the reference numeral 30 generally identifies a basic amplifier which employs four stages of amplification, the final stage also acting as a discriminator. Amplifier 30 has a signal input terminal G, and includes a pair of electron tubes 10 and 11. Electron tube 10 comprises two triodes 10a and 10b and tube 11 comprises two triode 11a and 11b. Triodes 10a, 10b and 11a are supplied with plate voltage from terminal P through load resistors 12, 13 and 14 respectively. The input signal from terminal G is applied to the grid of triode 10a through a coupling network comprising a capacitor 15 and a resistor 16. A balance signal is connected to the cathode of triode 10a at terminal K and a rate signal is supplied to $K_1$ which is connected to the cathode of triode 10a through capacitor 17. The plate of triode 10a is connected to the grid of triode 10b through a coupling network comprising a computer 20 and a resistor 21. Triode 10b is also provided with cathode bias by a cathode resistor 24. The plate of triode 10b is connected to the grid of triode 11a by a coupling network comprising a capacitor 22 and a resistor 23. Triode 11a has a resistor 25 in the cathode circuit which provides cathode bias. The plate of triode 11a is connected to the grid of triode 11b through a coupling network comprising a capacitor 26 and a resistor 27. Triode 11b has a cathode resistor 28 provided to produce cathode bias. Resistors 16, 21, 24, 23, 25, 27 and 28 are all connected to ground 31 to complete their respective circuits. The filaments of the tubes are connected between a filament terminal $F_1$ and a power ground terminal F, which is also connected to ground 31. A pulsating voltage or rectified alternating voltage is supplied on terminal $P_1$ and is used to excite the plate of triode 11b. The arrangement is such that triode 11b conducts only when the amplifier signal, from terminal G, appearing on the grid of triode 11b is in phase with the pulsating voltage on the plate. The amplifier just discussed is used in the motor servo circuits to be described and it will be understood that the amplifiers are identical and interchangeable.

The direction cosine signals are supplied by a seeker 40 as shown in FIGURE 1, which develops two output signals $M_a$ and $N_a$. The $M_a$ signal is sent to an $M_a$ servo 41 shown in more detail in FIGURE 3a, through connecting means 38, and the $N_a$ signal from seeker 40 is fed to an $N_a$ servo 42 shown in more detail in FIGURE 3b through connecting means 39. As $M_a$ servo 41 is driven to a position representative of the signal value $M_a$, a signal of equal magnitude and opposite sense is supplied by signal means 43 which is used to balance the input signal through connecting means 44, and signal means 47, 52, and 75 are simultaneously adjusted. In like manner, a balance signal is generated by signal means 45 of $N_a$ servo 42 and is used to balance the $N_a$ signal through connecting means 46, and signal means 57, 55, and 67 are simultaneously adjusted.

The $M_a$ signal present on signal means 47 is supplied to an $$\frac{M_a}{2}$$

divider 50 through connecting means 51: the $M_a$ term is divided by two, reversed in sense, and returned to signal means 52, where a multiplication is accomplished to give a signal equal to $$\frac{M_a}{2}$$

A constant signal of magnitude 1 is generated by a constant signal means 54, which is algebraically added to the signal at signal means 52 by connecting means 58. The output from signal means 52 is of magnitude $$1 - \frac{M_a^2}{2}$$

and is sent to $N_a$ signal means 55, through connecting means 56.

The $N_a$ signal present on signal means 57 is supplied to an $$\frac{N_a}{2}$$

divider 60 through a pair of connecting means 61 and 62. Divider 60 produces an output signal which is equal to $$\frac{-N_a}{2}$$

which is returned through connecting means 63 to signal means 55 where a multiplication is accomplished to give a signal equal to $$\frac{-N_a^2}{2}$$

This is algebraically combined with the $$\frac{-M_a^2}{2}$$

term to produce an output signal which is equal to $$1 - \frac{M_a^2}{2} - \frac{N_a^2}{2}$$

which is substantially equal to the third direction cosine $L_a$ as discussed below. The term $L_a$ is present on three connecting means 64, 65, and 66.

The $M_a$ signal obtained from signal means 47 is also supplied to signal means 67 through connecting means 70. A vertical gyro 71 includes roll signal means 72 which supplies a roll signal $\phi$ to signal means 67 of $N_a$ servo 42 through connecting means 73 and 74. There it is combined with the $N_a$ signal to produce a product signal of $N_a\phi$, which is algebraically combined with the $M_a$ signal received on connecting means 70 to produce an output signal equal to $M_a - N_a\phi$ on connecting means 77 which is connected to signal producing means 82 of heating servo 83.

The signal obtained from $N_a$ signal means 57 through connecting means 61 and 79, and a $\phi$ signal is supplied to signal means 75 from signal means 72 through connecting means 73 and 76. The $M_a$ signal and the $\phi$ signal are multiplied and the product is algebraically combined with the $N_a$ signal just received to produce an output signal which is equal to $N_a + M_a\phi$, and this signal is supplied on connecting means 81 to pitch signal means 84 in vertical gyro 71. Simultaneously an $L_a$ signal is supplied to pitch signal means 84, by connecting means 64 and 65. The signals are combined in such a manner as to produce a signal equal to $N_a + M_a\phi - L_aE$. This is the quantity $N_e$, a directional cosine referred to earth axes, and means 85.

The $\phi$ signal from signal means 72 is supplied to a pitch rate gyro 86 through a connecting means 87. The pitch rate gyro senses pitch rate $q$ of the craft and the pitch rate signal $q$ is combined with the roll signal $\phi$ to provide an output signal equal to $q\phi$ which is supplied on connecting means 90 to an integrating heading gyro 91. The integrating gyro senses the yaw rate $r$ of the craft: this is algebraically added to the $q\phi$ signal and the combination is integrated to provide a $\psi$ signal which is representative of the aircraft heading. The $\psi$ signal is supplied to heading servo 83 through connecting means 92. Signal means 93 creates a signal which is used to drive heading servo 83 to a null point through connecting means 94.

The $L_a$ signal on connecting means 66 is supplied to connecting means 82, where it is multiplied by $\psi$. The $M_a - N_a\phi$ signal is present on connecting means 77 and is combined with this $L_a\psi$ signal in signal means 82 to produce a signal equal to $M_a - N_a\phi + L_a\psi$. This is the quantity $M_e$, a second direction cosine referred to earth axis, and appears on connecting means 96. From signal producing means 82, the signal is supplied to an $M_e$ servo 95.

The $M_e$ signal positions the $M_e$ servo to a value representative of the signal received. A balance signal is created by signal means 97 that is of equal magnitude and opposite sense, and is returned to the $M_e$ servo through connecting means 98 to cause the $M_e$ servo to be driven to a null point or point of no rotation. Therefore, a second signal means 100 which is connected to the $M_e$ servo supplies a pair of connecting means 101 and 102 with the $M_e$ signal.

The $N_e$ signal on connecting means 85 may be supplied as an output on connecting means 107, and is also supplied on connecting means 105 to an $N_e$ servo 104. Signal means 103 supplies a signal through connecting means 106 which is made equal and opposite to the $N_e$ input: signal means 110 is simultaneously adjusted.

A pitch signal $E$ is received from signal means 84 and supplied through connecting means 113 to signal means 110, where the $N_e$ and $E$ signals are compared: their difference is used to unbalance the elevator servo and bridge 112 through connecting means 111.

Heading servo 83 has a signal means 114 which supplies a signal to an aileron servo and bridge 115 of the autopilot through connecting means 116. Aileron servo and bridge 115 receive a roll signal $\phi$ through connecting means 117 and an $M_e$ signal through connecting means 102. The combination of the $M_e$ signal, the $\psi$ signal, and the $\phi$ signal is used to control the aircraft in roll and therefore keep the aircraft on a correct heading. This operation will be more fully described at a later point in the specification.

Figure 2:
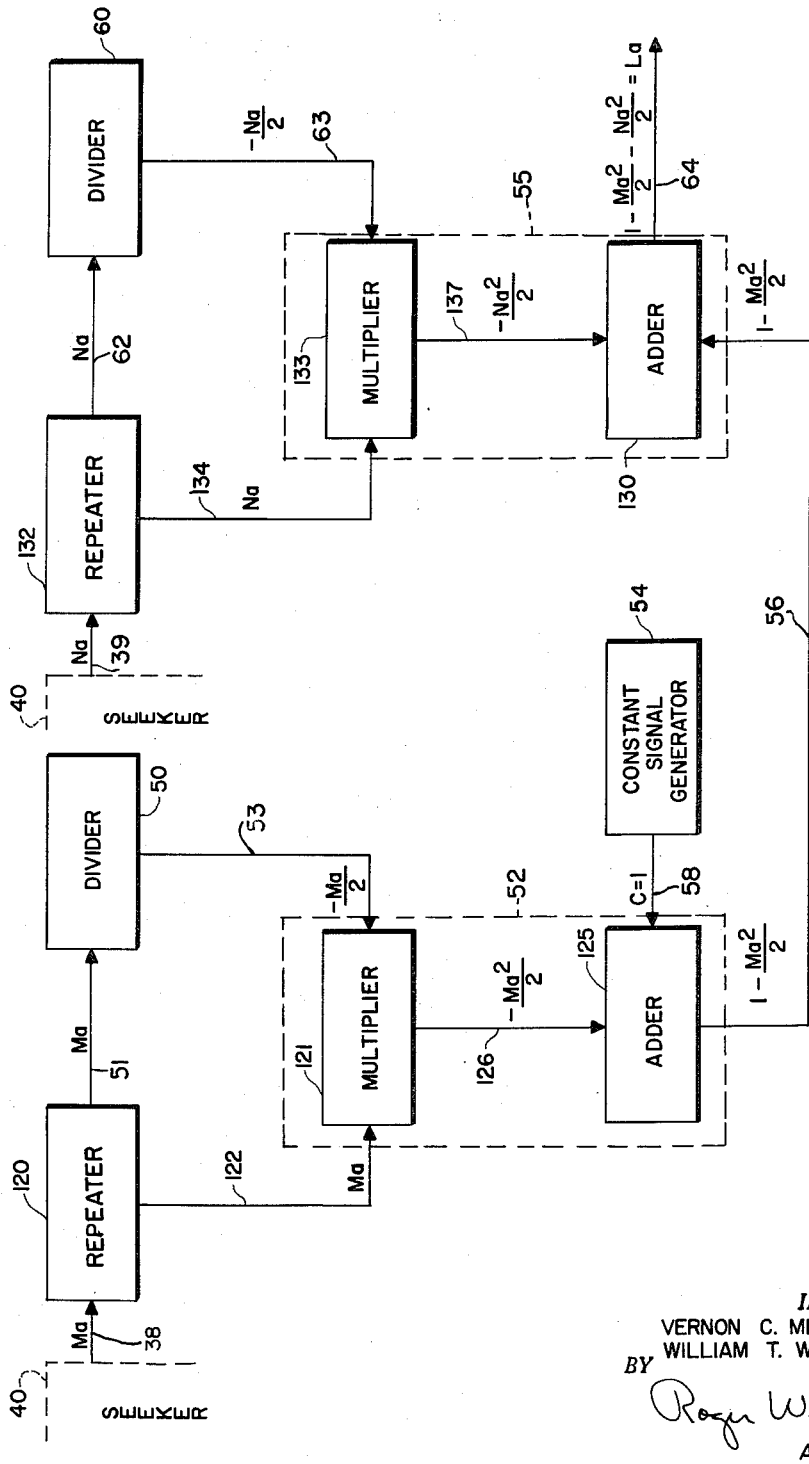
FIGURE 2 is a block diagram of the $L_a$ computer which is shown schematically in FIGURE 1.

The direction cosines describing the vector from the aircraft to the transmitting source when referenced to the airframe or aircraft are related by the equation $L_a^2 + M_a^2 + N_a^2 = 1$. Since seeker 40 produces only output signals of $M_a$ and $N_a$, the computer as shown in FIGURE 2 must derive the $L_a^2$ term so that a complete set of direction cosines are available to define the position of the aircraft with respect to a signal transmitter, referenced to the coordinate system of the aircraft. The previous equation may be rearranged to read $$L_a = \sqrt{1 - M_a^2 - N_a^2}$$

This may be approximated, for the usual case where the angular deviation of the longitudinal aircraft axis from the line to the transmitter is relatively small, by letting $L_a$ equal $$1 - \frac{M_a^2}{2} - \frac{N_a^2}{2}$$

FIGURE 2 is a detailed block diagram of the portion of FIGURE 1 within the broken line 2—2, and shows a repeater 120 which receives the $M_a$ signal and produces two output signals of $M_a$, one of which is sent to a multiplier 121 through a connecting means 122 and the other of which is sent to divider 50 through connecting means 51. Divider 50 divides the $M_a$ signal by two and gives it a negative sense so that a signal equal to $$-\frac{M_a}{2}$$

is supplied to multiplier 121 through connecting means 53. Multiplier 121 combines the $M_a$ and $$-\frac{M_a}{2}$$

signals to produce a product output which is equal to $$-\frac{M_a^2}{2}$$

which is supplied to an adder 125 through connecting means 126. The constant signal generator 54 produces an output signal through connecting means 58 of unity value which is combined with the $$-\frac{M_a^2}{2}$$

signal in adder 125 so that the signal leaving the adder is equal to $$1 - \frac{M_a^2}{2}$$

This signal is supplied as one input to a second adder 130 through connecting means 56.

A second repeater 132 receives the $N_a$ signal and produces a pair of output signals representing $N_a$, one of which is supplied to a multiplier 133 through connecting means 134 and the other of which is supplied to divider 60 through connecting means 62. Divider 60 divides the $N_a$ signal by two and gives it a negative sense so that a signal equal to $$-\frac{N_a}{2}$$

is supplied to multiplier 133 through connecting means 63. Multiplier 133 combines the $N_a$ and $$-\frac{N_a}{2}$$

signals to produce a product signal equal to $$-\frac{M_a^2}{2}$$

this is supplied to adder 130 through connecting means 137. An output is obtained from adder 130 on connecting means 64 which is equal to $$1 - \frac{M_a^2}{2} - \frac{N_a^2}{2}$$

Elements 121, 125 and 126 of FIGURE 2 make up member 52 of FIGURE 1, and elements 130, 133 and 137 of FIGURE 2 make up member 55 of FIGURE 1.

Figure 3B:
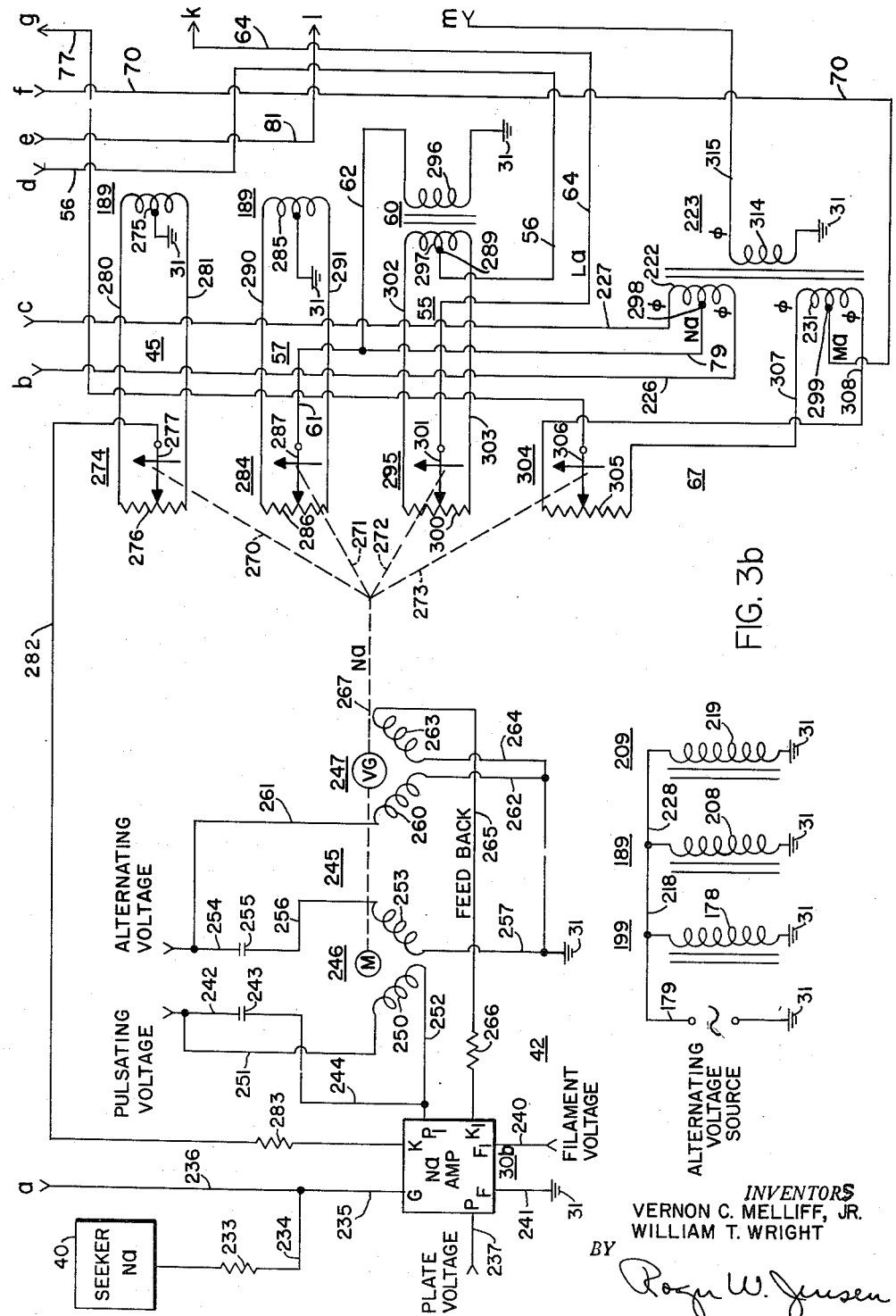
FIGURE 3b is a schematic diagram showing a portion of the computer which operates on an input signal $N_a$.

Three transformers, 189, 199 and 209 are shown in FIGURE 3b and are used to supply voltages to certain potentiometers employed in the servo circuits. Transformers 189, 199 and 209 have primary windings 208, 178 and 219 respectively, and each has a number of secondary windings. The secondary windings will be shown connected to their respective elements of each of the servos. One terminal of primary windings 178, 208 and 219 is connected to an alternating voltage source through three connecting leads 179, 218 and 228. The other terminals of primary windings 178, 208, and 219 and of the alternating voltage source, are connected to ground 31.

The $M_a$ servo 41 includes an amplifier 30a and a motor-generator 141, as shown in FIGURE 3a. Motor generator 141 comprises a motor 139 and a rate generator 140 having a common shaft 184. The seeker 40 supplies the $M_a$ signal as an input to amplifier 30a through a coupling resistor 142 and a pair of connecting leads 143 and 144: elements 142 and 143 comprise member 38 of FIGURE 1. The signal as supplied to resistor 142 is a unidirectional voltage which is changed to a pulsating voltage by the use of a modulator 145. Modulator 145 is generally known as a vibrator and comprises a pair of movable contact arms 146 and 147 and a pair of fixed contact points 150 and 151. Movable contact arms 146 and 147 are connected to ground 31 by a pair of connecting leads 152 and 153. The modulating device 145 has a solenoid 154 which is connected to an alternating voltage source 155 by a pair of connecting leads 156 and 157. Connecting lead 157 is connected to ground 31. The voltage which appears on coupling resistor 142 and connecting lead 143 is connected to contact point 150 by a connecting lead 159 and as the alternating voltage source 155 causes the contact arms to be vibrated by the magnetic field set up in solenoid 154, the voltage is alternately first transmitted to the input of amplifier 30a and then grounded at ground 31. This method is employed to produce a pulsating voltage which is used as an input signal to amplifier 30a. Plate voltage is supplied to terminal P of amplifier 30a through a connecting lead 160. The filament voltage for amplifier 30a is sent to terminal $F_1$ through a connecting lead 161 and filament terminal F is connected to ground 31. Amplifier 30a has terminal $P_1$ excited by a voltage which is rectified but unfiltered to produce pulsating unidirectional pulses which are connected to amplifier 30a through a connecting lead 166, control field 165 of motor 139 and connecting lead 167. A capacitor 163 is connected in shunt with field 165 by connecting leads 162 and 164.

The excitation field 170 of motor 139 is excited by alternating voltage which is connected to winding 170 through a connecting lead 171, a capacitor 172, and a connecting lead 173. The excitation field 174 of rate generator 140 is connected to the alternating excitation voltage by a connecting lead 175. The two excitation field circuits are completed to ground 31 by a pair of connecting leads 176 and 177. The control field 180 of rate generator 140 is connected to ground 31 by a connecting lead 181 and has its other terminal connected to amplifier terminal $K_1$ through a connecting lead 182 and a coupling resistor 183. Motor 139 operates shaft 184, which in turn simultaneously rotates four shafts 185, 186, 187 and 188.

Motor generator 141 is operated since the alternating excitation voltage is phase shifted by capacitor 172, and when a pulse of current is allowed to flow in control field 165 due to the presence on the grid of triode 11b (FIGURE 2) of a voltage in phase with the pulsating voltage on the plate of the triode, the signal causes motor generator 141 to be rotated in a direction which corresponds to the sense of the $M_a$ signal received from seeker 40.

Signal means 43 (FIGURE 3a) comprises a potentiometer 190 and one secondary winding 191 of transformer 189. Potentiometer 190 comprises a resistive element 192 and a movable contact arm 193. Transformer secondary 191 is connected to resistive element 192 by a pair of connecting leads 194 and 195, and is center tapped to ground 31 by a connecting lead 196. A rebalance signal which is of a sense to oppose the $M_a$ input signal is produced on movable contact arm 193 and is returned to terminal K of amplifier 30a through a connecting lead 197 and a resistor 198, which make up connecting means 44 of FIGURE 1. Operation of motor 139 continues until the effective input to amplifier 30a is reduced to zero, at which time the positions of shafts 184, 185, 186, 187, and 188 are representative of $M_a$.

Signal producing means 47 comprises a potentiometer 200 and another secondary 201 of transformer 189. Potentiometer 200 comprises a resistive element 202 and a movable contact arm 203. Resistive element 202 is connected to transformer secondary 201 by a pair of connecting leads 204 and 205. Transformer secondary winding 201 is center tapped to ground 31 by a connecting lead 206. When servo 41 is balanced a signal equal to $M_a$ is produced by movable contact arm 203 and appears on a connecting lead 207.

Signal means 52 comprises a potentiometer 210, and is energized from a transformer which comprises $$\frac{M_a}{2}$$

divider 50. Potentiometer 210 comprises a resistive element 211 and a movable contact arm 212. Transformer 50 has a primary winding 213 which is connected to ground 31 and energized from contact arm 203 through connecting leads 207 and 51. Transformer 50 has a secondary winding 214 which has a center tap 229 and which is connected to resistive element 211 by a pair of connecting leads 215 and 216. Transformer 50 has a two to one turns ratio between primary winding 213 and each half of secondary winding 214. Movable contact arm 212 is connected to a constant signal generator 54 which is secondary winding 217 of transformer 189 by connecting lead 58. Transformer secondary winding 217 is also connected to ground 31.

Signal means 75 comprises a potentiometer 221 and a center tapped secondary winding 222 of a transformer 223 the latter being shown in FIGURE 3b. Potentiometer 221 comprises a resistive element 224 and a movable contact arm 225. Resistive element 224 is connected to transformer secondary 222 by a pair of connecting leads 226 and 227 which comprises connecting means 76 of FIGURE 1.

A signal representative of $M_a$ is sent to secondary winding 231 of transformer 223 which is shown in FIGURE 3b from movable contact arm 203 (FIGURE 3a) through a connecting lead 70 and connecting lead 207.

The voltage between contact arm 203 and ground, and hence the voltage on primary winding 213, is equal to $M_a$, and the voltage across each half of secondary winding 214 is thus $$\frac{M_a}{2}$$

The voltage between center tap 229 and contact arm 212 is $$\frac{M_a^2}{2}$$

since the arm is also positioned in accordance with $M_b$. The voltage between arm 212 and ground is equal to 1 on the same scale. Accordingly the voltage between center tap 229 and ground is equal to $$1 - \frac{M_a^2}{2}$$

the subtraction being accomplished by proper phasing of the connections to secondary windings 201 and 217. Connecting lead 56 is connected to center tap 229, and connecting lead 70 is connected to contact arm 225.

The $N_a$ servo includes an amplifier 30b and a motor generator 245, as shown in FIGURE 3b. The motor generator 245 comprises a motor 246 and a rate generator 247 having a common shaft 267. Seeker 40 supplies an $N_a$ signal to terminal G of $N_a$ amplifier 30b through a resistor 233 and a pair of connecting leads 234 and 235: elements 233, 234, and 235 make up member 39 of FIGURE 1. The unidirectional voltage thus supplied is modulated by modulator 145 of FIGURE 3a through a connecting lead 236. Plate voltage is supplied to termianl P of $N_a$ amplifier 30b through a connecting lead 237. Filament voltage is received on terminal $F_1$ of $N_a$ amplifier 30b through a connecting lead 240 and the circuit is completed by connecting ground 31 to terminal F through a connecting lead 241. Pulsating voltage is suppled to terminal $P_1$ of $N_a$ amplifier 30b through connecting lead 251, control field 250 of motor 246, and connecting lead 252. A capacitor 243 is connected in shunt with field 250 by connecting leads 242 and 244.

The excitation field 253 of motor 246 is excited by an alternating voltage through a connecting lead 254, a capacitor 255, and a connecting lead 256. The other end of excitation winding 253 is connected to ground 31 by a connecting lead 257. The excitation field 260 of rate generator 247 is excited by the alternating voltage through a connecting lead 261 and the circuit is completed by connecting the other end of winding 260 to ground 31 through a connecting lead 262. The control field 263 of rate generator 247 is connected to ground 31 through a connecting lead 264 and has its other end connected to terminal $K_1$ of amplifier 30b through a connecting lead 265 and a resistor 266. When a signal is received at the input of $N_a$ amplifier 30b on terminal G, the signal causes motor 246 to rotate a common shaft 267. The capacitors 243 and 255 which are in the field circuits of motor 246 provide the necessary phase shift of the motor fields to cause the motor to rotate and capacitor 243 and control field 250 act as a load impedance for amplifier 30b. The operation of amplifier 30b and motor generator 245 is as previously described in connection with $M_a$ servo 41. Thus means is provided for causing shaft 267 to be rotated. Shaft 267 is connected to four shafts 270, 271, 272, and 273.

Signal means 45 comprises a potentiometer 274 and a secondary winding 275 of transformer 189. Potentiometer 274 comprises a resistive element 276 and a movable contact arm 277. Transformer secondary winding 275 is connected to resistive element 276 by a pair of connecting leads 280 and 281 and is connected to ground 31 at its center point. Shaft 270 positions movable contact arm 277 to vary the rebalance signal thereon which is of opposite seanse to $N_a$ and this signal is supplied to terminal K of amplifier 30b through a connecting lead 282 and a resistor 283, which comprise connecting means 46 of FIGURE 1. In a manner like that described in connection with FIGURE 3a shafts 270, 271, 272, and 273 are positioned at a value representative of $N_a$.

Signal means 57 comprises a potentiometer 284 and a secondary winding 285 of transformer 189. Potentiometer 284 comprises a resistive element 286 and a movable contact arm 287. Transformer secondary winding 285 is connected to resistive element 286 by a pair of connecting leads 290 and 291 and is center tapped to ground 31. A signal equal to $N_a$ is produced by contact arm 287.

Signal producing means 55 comprises a potentiometer 295, and energized from a transformer which comprises $$\frac{N_a}{2}$$

divider 60. Transformer 60 has a primary winding 296, which is connected to ground 31 and to connecting leads 62 and 61, and a secondary winding 297 which is center tapped at 289. Potentiometer 295 comprises a resistive element 300 and a movable contact arm 301. Resistive element 300 and transformer secondary 297 are connected by a pair of connecting leads 302 and 303, making up connecting means 63 of FIGURE 1. Transformer 60 has a two to one turns ratio between primary winding 296 and each half of secondary winding 297.

Signal means 67 comprises a potentiometer 304 and a secondary winding 231 of transformer 223. Potentiometer 304 comprises a resistive element 305 and a movable contact arm 306. Resistive element 305 is connected to transformer secondary 231 by a pair of connecting leads 307 and 308 which comprise connecting means 74 of FIGURE 1. Movable contact arm 306 is connected to the center tap of a transformer secondary winding 501 shown on FIGURE 3d by a connecting lead 77.

Transformer 223 has a primary winding 314 which has one terminal connected to ground 31 and the other to a connecting lead 315. As shown in FIGURE 3e lead 315 is energized from the roll section 72 of vertical gyro 71, and together with transformer 223 makes up connecting means 73 of FIGURE 1.

The voltage between contact arm 287 and ground, and hence the voltage on primary winding 296, is equal to $N_a$, and the voltage across each half of secondary winding 297 is thus $$\frac{N_a}{2}$$

The voltage between center tap 289 and contact arm 301 is $$\frac{N_a^2}{2}$$

since the arm is also positioned in accordance with $N_a$. The voltage between center tap 289 and ground is equal to $$1-\frac{N_a^2}{2}$$

Accordingly the voltage between contact arm 301 and ground is equal to $$1-\frac{M_a^2}{2}-\frac{N_a^2}{2}$$

or $L_a$, the subtraction being accomplished by proper phasing of the connections to secondary windings 285 and 297. Connecting means 64 is connected to contact arm 301.

The vertical gyro 71 as seen in FIGURE 3e has a potentiometer 316 located in its roll section to comprise a portion of member 72, FIGURE 1. Potentiometer 316 comprises a resistive element 317 and a movable contact arm 320 which receives connecting lead 315. A secondary winding 321 of transformer 189 is connected to resistive element 317 by a pair of connecting leads 322 and 323 and is center tapped to ground 31. A $\phi$ signal representative of the aircraft roll appears on movable contact arm 320 which is supplied to transformer 223 (FIGURE 3b) by connecting lead 315. The $\phi$ signal then appears on transformer secondary 222 which in turn is used to energize resistive element 224 (FIGURE 3a) of potentiometer 221. Therefore a product signal is developed between center tap 298 and contact arm 225 which is equal to $M_a\phi$. This signal is added to the $N_a$ signal between contact arm 284 and ground, by connecting leads 79 and 61, to give a signal representative of $N_a+M_a\phi$ between ground and a connecting lead 81 connected to a pair of resistors 325 and 326 shown on FIGURE 3e. Resistors 325 and 326 are connected in series and the series combination is connected in parallel with a secondary winding 327 of transformer 311 which comprises connecting means 65 of FIGURE 1. A potentiometer 330 which has a resistive element 331 is connected in parallel with transformer secondary winding 327 by a pair of connecting leads 332 and 333 to comprise a portion of member 84, FIGURE 1. Potentiometer 330 also has a movable contact arm 334, which is adjusted in accordance with the pitch E of the aircraft.

Signal producing means 103 comprises a potentiometer 335 and a secondary winding 336 of transformer 199. Potentiometer 335 comprises a resistive element 337 and a movable contact arm 340. Transformer secondary winding 336 is connected to resistive element 337 by a pair of connecting leads 341 and 342. The $L_a$ signal induced in secondary winding 327 of transformer 311 is impressed across resistance element 330, and a product signal equal to $L_aE$ is developed between contact arm 334 and connecting lead 81. This is added in series with the $N_a+M_a\phi$ signal between connecting lead 81 and ground, so that the signal appearing as an output signal on movable contact arm 334 is $N_a+M_a\phi-L_aE$, or $N_e$, and this signal is supplied to $N_e$ servo 104, which is shown to comprise an amplifier 30e and a motor generator 357 made up of a motor 360 and a rate generator 361 having a common shaft 381, through a connecting lead 85. The signal just described and the signal between contact arm 340 and the center tap of winding 336 are compared, and any error signal is impressed across a voltage divider, comprising a pair of resistances 345 and 346, by a connecting lead 106. Resistors 345 and 346 are connected in series and one end of resistor 345 is connected to ground 31, the common connection of resistors 345 and 346 being conected to terminal G of $N_e$ amplifier 30e through a connecting lead 350.

Filament voltage is connected to terminal $F_1$ of $N_e$ amplifier 30e through a connecting lead 351 and the circuit is completed by connecting terminal F to ground 31 through a connecting lead 352. Plate voltage is supplied to terminal P of $N_e$ amplifier 30e through a connecting lead 353, and a pulsating voltage is used to energize terminal $P_1$ of $N_e$ amplifier 30e through a connecting lead 364, motor control field 362, and a connecting lead 363. A capacitor 355 is connected in shunt with field 362 by connecting leads 354 and 356. An alternating voltage energizes the excitation field 365 of motor 360 by a connecting lead 366, a capacitor 367, and a connecting lead 370. The other end of excitation winding 365 is connected to ground 31 through a connecting lead 371. The excitation field 372 of velocity generator 361 has one end connected to the alternating voltage source through a connecting lead 373 and the other end connected to ground 31 by a connecting lead 374. The control field winding 375 of velocity generator 361 has one end connected to terminal $K_1$ of $N_e$ amplifier 30 by a connecting lead 376 and has the other end connected to ground 31 by a connecting lead 377. Terminal K of $N_e$ amplifier 30 is connected to ground 31 through a biasing resistor 380. As described in connection with FIGURE 3a, motor 360 operates to drive shaft 381, which in turn drives a pair of shafts 382 and 383.

Signal producing means 110 comprises a potentiometer 384 and a center tapped secondary winding 385 of transformer 209. Potentiometer 384 comprises a resistive element 386 and a movable contact arm 387. Transformer secondary winding 385 and resistive element 386 are connected in parallel by a pair of connecting leads 390 and 391. Leads 111 and 405 connect center tap 398 with elevator servo and bridge 112.

A bridge network 392 comprises a pair of resistors 393 and 394 which are connected in series and a potentiometer 395. Potentiometer 395 comprises a resistive element 396 and a movable contact arm 397 which is connected to ground 31. Elements 316, 330, and 395 comprise member 84 of FIGURE 1. Movable contact arm 397 is positioned by a pitch signal E. Movable contact arm 387 of potentiometer 384 is connected to the common junction point of resistors 393 and 394 by connecting lead 131. The other ends of resistors 393 and 394 are connected to resistive element 396 by a pair of connecting leads 402 and 403 energized from a transformer secondary winding 399.

Member 112 includes an airspeed compensator servo 409, an elevator servo 429, and an elevator bridge 418. Lead 405 is connected to the center tap 418' of a transformer secondary winding 420' which energizes the resistive element 415 of a potentiometer 414 through connecting leads 416' and 417'. A second potentiometer 410 has its resistive element 411 connected between contact arm 413 of potentiometer 415 and the junction point between conductors 405 and 111, by conductors 419 of potentiometer 410 and 421. The contact arm 412 of potentiometer 410 is connected by conducting lead 422 to supply the input to the amplifier 407 of compensator servo 409, the circuit being completed to ground through a conducting lead 408. Motor 406 of servo 409 acts through a mechanical connection 423 to adjust control contact arm 413, and through a further mechanical connection 423' to adjust the contact arm 413' of another potentiometer 414' having a resistive element 415' energized from a transformer secondary winding 420 through conducting leads 416 and 417. Contact arm 413' is connected to ground 431.

The apparatus just described functions to position arm 413' on element 415' in proportion to the position of arm 413 on element 415, the proportion being determined by the setting of arm 411, that is, by the true airspeed. Arm 415 is of course positioned in accordance with the signal between conductors 405 and ground.

A potentiometer 424 comprises a resistive element 426 and a movable contact arm 425. Resistive element 426 is connected in parallel with transformer secondary winding 420 by a pair of connecting leads 427 and 428. Elevator servo 429 receives the signal from movable contact arm 425 through a connecting lead 438. Elevator servo 429 is also connected to ground 31. The motor of elevator servo 429 rotates a pair of shafts 439 to adjust 449 to control an elevator surface 448 and movable contact arm 425. As the elevator bridge is unbalanced, in response to a signal on conducting lead 111, a signal is sent to elevator servo 429 which causes the motor to actuate elevator surface 448 and rebalance the elevator bridge by positioning movable contact arm 425 to a new position. In response to the decrease in the signal on lead 111 the elevator bridge is oppositely unbalanced and a signal of opposite sense is then applied to elevator servo 429 which causes elevator surface 448 to be driven back to a level position and shaft 449 simultaneously balances the bridge by positioning movable contact arm 425 to a new position.

Referring now to FIGURE 3d, the roll section 72 of vertical gyro 71 includes a potentiometer 430 and a secondary winding 431 of transformer 189. Potentiometer 430 comprises a movable contact arm 432, operated by the vertical gyro in accordance with the roll angle $\phi$ of the craft, and a resistive element 433. Resistive element 433 and transformer secondary winding 431 are connected in parallel by a pair of connecting leads 434 and 435, and transformer secondary winding 431 is center tapped to ground 31.

Pitch rate gyro 86 contains a multiplying means 436 comprising a potentiometer having a resistive element 437 and a movable contact arm 440 operated by gyro 86 in accordance with the pitch rate $q$ of the craft. One end of resistive element 437 is connected to a center tap on resistive element 433 by a connecting lead 441. The other end of resistive element 437 is connected to movable contact arm 432 by a connecting lead 442; leads 441 and 442 comprise connecting means 87 of FIGURE 1. Thus there appears between movable contact arm 440 and ground a signal representative of the product $q\phi$ of roll and pitch rate which is sent to integrating gyro 91 through a connecting lead 90.

Integrating gyro 91 also has an input of yaw rate $r$: the $q\phi$ signal and the $r$ signal are algebraically added and the sum is integrated with respect to time to provide a heading signal $\psi$ at the integrating gyro output. Integrating gyro 91 is provided a ground reference by connecting leads 444, 445, and 446. The $\psi$ signal from the output section of integrating gyro 91 is supplied to a voltage divider 447 through a connecting lead 450. Voltage divider 447 comprises a resistor 451 which is connected to connecting lead 450 on one end and connected to a resistor 452 on the other end. Resistor 452 is grounded on the other end by ground 31. The output from voltage divider 447 appears between ground and connecting lead 92.

Heading servo 83 is shown to comprise an amplifier 30d and a motor generator 467 including a motor 470 and a rate generator 471 on a common shaft 494. Signal producing means 93 comprises a potentiometer 453 and a secondary transformer winding 454 of transformer 199. Potentiometer 453 comprises a resistive element 455 and a movable contact arm 456. Resistive element 455 and transformer secondary winding 454 are connected in parallel by a pair of connecting leads 457 and 460. The signal on lead 92 and the signal between arm 456 and the center tap on winding 455 are compared, and any difference is sent to terminal G of a $\psi$ amplifier 30d, through a connecting lead 94. $\psi$ amplifier 30d has filament voltage provided at terminal $F_1$ through a connecting lead 463, the circuit being completed to ground 31 by a connecting lead 464 connected to terminal F. Plate voltage is provided at terminal P of $\psi$ amplifier 30d by a connecting lead 465. Terminal K of $\psi$ amplifier 30d is connected to ground 31 through a biasing resistor 466. Motor 470 comprises a control field 472 and an excitation field 473.

Pulsating voltage is supplied to terminal $P_1$ of amplifier 30d through conducting lead 474, control field 472 of motor 470, and connecting lead 475. A capacitor 477 is connected in shunt with field 472 by conducting leads 476 and 480. Excitation field 473 is connected to an alternating voltage source through a connecting lead 481, a capacitor 482, and a connecting lead 483. The other end of excitation field 473 is connected to ground 31 through a connecting lead 484. Rate generator 471 comprises a control field 485 and an excitation field 486. One end of excitation field 486 is connected to the alternating voltage source through a connecting lead 487 and the other end is connected to ground 31 through a connecting lead 490. Control field 485 has one end connected to ground 31 through a connecting lead 491 and the other end connected to terminal $K_1$ of $\psi$ amplifier 30d through a connecting lead 492 and a resistor 493. Capacitors 482 and 477 provide the necessary phase shift in the fields of motor 470 to cause the motor to rotate when a signal is present on terminal G of $\psi$ amplifier 30d. As motor generator 467 rotates, it rotates a shaft 494 which in turn rotates three shafts 495, 496, and 497. As shaft 496 rotates it positions movable contact arm 456 of potentiometer 453 and provides a voltage which is of opposite sense to the signal received from voltage divider 447 and thus the error signal which is present on connecting lead 94 is reduced until the balance signal created on movable contact arm 456 is equal in magnitude and opposite in sense to the signal received by transformer secondary winding 454 through connecting lead 92.

Signal producing means 82 comprises a potentiometer 500 and a secondary 501 of transformer 311 which comprises connecting means 66 of FIGURE 1. Potentiometer 500 comprises a resistive element 502 and a movable contact arm 503. Resistive element 502 and transformer secondary winding 501 are connected in parallel by a pair of connecting leads 504 and 505. An $M_a-N_a\phi$ signal is supplied to a center tap on secondary winding 501 of transformer 311 on conducting lead 77, and is added to the $L_a\psi$ signal in signal producing means 82. There appears a signal equal to $M_a-N_a\phi+L_a\psi$ which is defined as the $M_e$ signal and this signal is sent to signal producing means 97 of FIGURE 3c through a connecting lead 96.

Figure 3C:
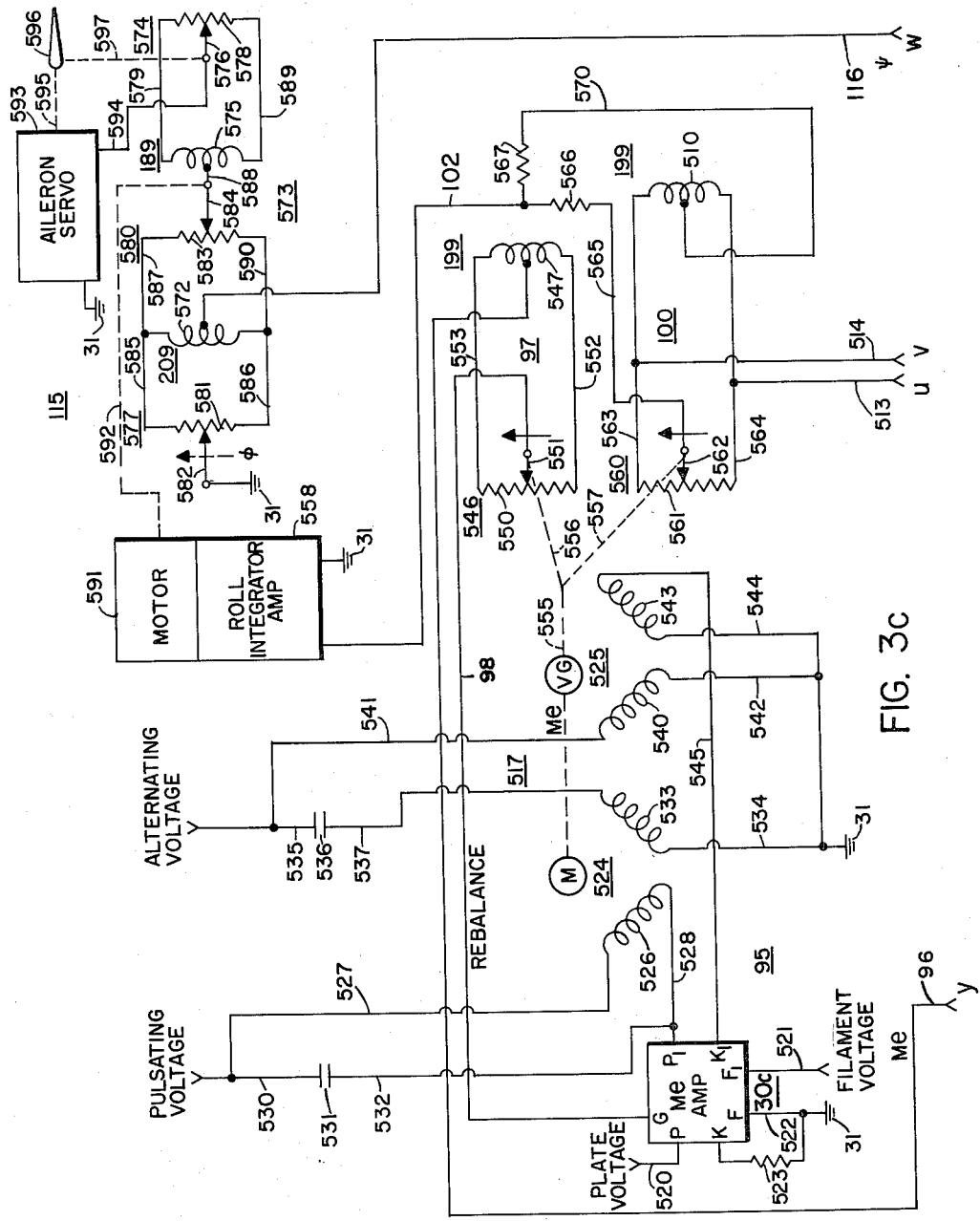
FIGURE 3c is a schematic diagram showing a portion of the computer which computes an output term $M_e$.
Figure 3E:
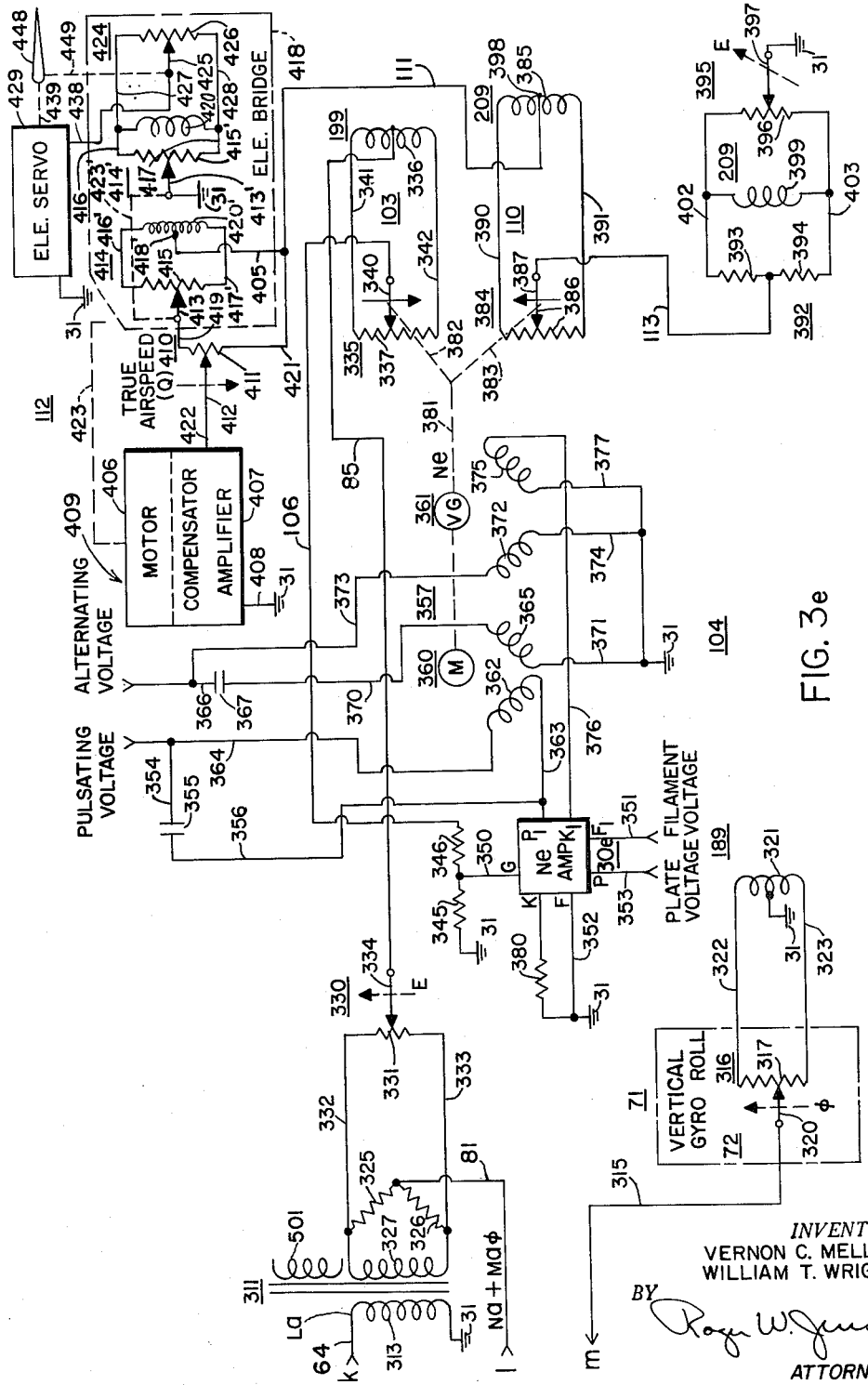
FIGURE 3e is a schematic diagram comprising a portion of the computer which computes an output term $N_e$; and, FIGURE 4 is a schematic diagram showing a typical amplifier used in the control servos of the computer.

Signal producing means 114 (Figure 3d) comprises a potentiometer 507 and a transformer secondary winding 510 of transformer 199 shown in FIGURE 3c. Potentiometer 507 (FIGURE 3d) comprises a resistive element 511 and a movable contact arm 512. Resistive element 511 and transformer secondary 510 are connected in parallel by a pair of connecting leads 513 and 514 which comprises connecting means 116 of FIGURE 1. Therefore, as shaft 495 rotates movable contact arm 512 a signal representative of the aircraft heading or $\psi$ is presented on movable contact arm 512 which is sent to a center tap on transformer secondary 571, as seen in FIGURE 3c, by a connecting lead 116.

Control means 95 is shown in FIGURE 3c to comprise an $M_e$ amplifier 30c and a motor generator combination 517. $M_e$ amplifier 30c has plate voltage supplied to terminal P through a connecting lead 520 and has filament voltage supplied to terminal $F_1$ through a connecting lead 521, the circuits being completed to ground 31 from terminal F by a connecting lead 522. Terminal K on $M_e$ amplifier 30c is connected to ground 31 by a biasing resistor 523. Motor generator combination 517 comprises a motor 524 and a rate generator 525. Motor 524 has a control field 526 which is excited by a pulsating voltage source through a connecting lead 527. The other end of control field 526 is connected to terminal $P_1$ of $M_e$ amplifier 30c by a connecting lead 528. Terminal $P_1$ is also connected to the pulsating voltage source by a connecting lead 530, a capacitor 531, and a connecting lead 532. Capacitor 531 and control field 526 provide a load impedance for the output stage of $M_e$ amplifier 30c at terminal $P_1$. Motor 524 has an excitation field 533 which has one end connected to ground 31 by a connecting lead 534. The other end of excitation field 533 is connected to an alternating voltage source by a connecting lead 535, a capacitor 536, and a connecting lead 537. Rate generator 525 has an excitation field 540 which has one end connected to the alternating voltage source through a connecting lead 541 and has the other end connected to ground 31 through a connecting lead 542. A control field 543 of rate generator 525 is connected to ground 31 through a connecting lead 544 and has the other end connected to terminal $K_1$ of $M_e$ amplifier 30c through a connecting lead 545.

Signal producing means 97 consists of a potentiometer 546 and a secondary winding 547 of transformer 199. Potentiometer 546 comprises a resistive element 550 and a movable contact arm 551. Resistive element 550 and transformer secondary winding 547 are connected in parallel by a pair of connecting leads 552 and 553. An $M_e$ signal which was received on connecting lead 96 is connected to a center tap of secondary winding 547. Therefore, a signal is presented on movable contact arm 551 which is the error or difference between the received $M_e$ signal and the one generated between the center tap and arm 551 and this signal is sent to terminal G of $M_e$ amplifier 30c through a connecting lead 98, connected to movable contact arm 551. Therefore, an error signal representative of the value of $M_e$ is sent to terminal G of $M_e$ amplifier 30c and as the pulsating voltage is received on terminal $P_1$, a current is caused to flow through control winding 526 and thereby rotate motor generator 517 which drives a shaft 555. Shaft 555 in turn drives a pair of shafts 556 and 557. Shaft 556 rotates movable contact arm 551 causing the voltage developed across resistive element 550, which is of opposite sense to the $M_e$ signal received on connecting lead 96, to balance the $M_e$ signal and therefore prevent the motor generator combination 517 from rotating further. Thus there exists mechanically on shafts 556 and 557 a value representative of the $M_e$ signal.

Signal producing means 100 comprises a potentiometer 560 and the secondary winding 510 of transformer 199. Potentiometer 560 comprises a resistive element 561 and a movable contact arm 562. Resistive element 561 is connected in parallel with transformer secondary winding 510 by a pair of connecting leads 563 and 564. Movable contact arm 562 is connected to a center tap of transformer secondary 510 by a connecting lead 565, a resistor 566, a resistor 567, and a connecting lead 570. At the junction of resistors 566 and 567 a connecting lead 102 is originated and terminates at roll integrator amplifier 558. Roll integrator amplifier 558 is also connected to ground 31. The $\psi$ signal which is received on connecting lead 116 is sent to a center tap of a secondary 572 of transformer 209. An aileron servo bridge 573 comprises transformer secondary winding 572, a secondary winding 575 of transformer 189, a potentiometer 574, a potentiometer 577 and a potentiometer 580. Potentiometer 574 has a movable contact arm 576 and a resistive element 578. Transformer secondary winding 575 is connected to resistive element 578 by a pair of connecting leads 579 and 589. Potentiometer 577 comprises a resistive element 581 and a movable contact arm 582. Elements 430 (FIGURE 3d) and 577 (FIGURE 3c) make up member 72 of FIGURE 1. Movable contact arm 582 is connected to ground 31 and is physically connected to the roll portion of vertical gyro 72. Potentiometer 580 comprises a resistive element 583 and a movable contact arm 584. Resistive element 581 is connected in parallel with transformer secondary winding 572 by a pair of connecting leads 585 and 586, which comprise connecting means 117 of FIGURE 1, and resistive element 583 is connected in parallel with transformer secondary winding 572 by a pair of connecting leads 587 and 590. Movable contact arm 584 is connected to a center tap of transformer secondary 575 by a connecting lead 588.

The input to roll integrator amplifier 558 is the sum of signals representative of $M_e$, $\psi$, and $\phi$ and operation of motor 591 in response thereto adjusts contact arm 584 accordingly, as long as the sum is not equal to zero. The input to aileron servo 593 is the sum of $\phi$, the roll integrator signal, and an aileron position signal. The normal condition of the apparatus, occurring after the aircraft has remained in level flight on the proper heading for a sufficient interval, is that in which arms 582, 584, and 576 are at the centers of their windings, with $M_e$ equal to $\psi$.

While it has not been specifically shown, appropriate gearing is used between the motors and the driven components in all the servo or control systems just described.

*Operation*

Operation of the block diagram of FIGURE 1 will first be shown. Here the signals received from seeker 40 are used to develop a third term $L_a$ and the three signals $N_a$, $M_a$ and $L_a$ are combined with roll, pitch, and heading to produce the desired output signals of $M_e$ and $N_e$, as follows. Seeker 40 receives the beam which is transmitted generally from a ground station and converts the received signal into a pair of direction cosines $M_a$ and $N_a$. The $M_a$ signal is sent to $M_a$ servo 41, and assuming that $M_a$ servo is set at some position other than the value received, it drives to a new position where a rebalance signal from signal means 43 causes the servo to be in a null position. In like manner, the $N_a$ signal is used to drive the $N_a$ servo to a new position with a balance signal being produced from signal means 45. Therefore, the value of $M_a$ is mechanically present on signal means 47, 52 and 75, and a value of $N_a$ is mechanically present on signal means 57, 55, and 67.

Since it is desirable to produce a signal representative of $L_a$, and since $L_a$ approximates $$1 - \frac{M_a^2}{2} - \frac{N_a^2}{2}$$

the $L_a$ term is computed as follows. Constant signal generator 54 produces a signal equal to one which is sent to signal means 52. A signal having a value of $M_a$ is supplied from signal means 47 to divider 50 to produce a signal of $$\frac{M_a}{2}$$

This quantity is multiplied by $M_a$ in signal means 52 to produce a product signal of $$-\frac{M_a^2}{2}$$

and is then algebraically combined with the constant signal to give the term $$1 - \frac{M_a^2}{2}$$

The $$1 - \frac{M_a^2}{2}$$

term is sent to signal means 55 through connecting means 56. The $N_a$ signal obtained from signal means 57 is sent to divider 60 and the resulting $$\frac{N_a}{2}$$

signal is returned to signal means 55 where a product signal $$-\frac{N_a^2}{2}$$

is computed. This is then algebraically combined with the $$1 - \frac{M_a^2}{2}$$

term in such a manner as to produce a signal on lead 64 representative of $L_a$ or $$1 - \frac{M_a^2}{2} - \frac{M_a^2}{2}$$

Vertical gyro 71 has inputs of roll and pitch or $\phi$ and E respectively. The $\phi$ signal is sent to signal means 75 where it is multiplied by $M_a$ to give a product signal $M_a\phi$ which is added to an $N_a$ signal received from signal means 57 to provide a signal equal to $N_a + M_a\phi$. This signal is supplied on lead 81 to the pitch section 84 of vertical gyro 71.

The $L_a$ term on lead 64 is also supplied on lead 65 to pitch section 84 of vertical gyro 71 where it is multiplied by E and the product is added to the signal supplied on lead 65 to produce an output signal equal to $$N_a + M_a\phi - L_a E$$

This signal was previously defined as being equal to $N_e$. Thus the $N_a$ term which was received in aircraft coordinates has been transformed into a signal referenced to an earth system of coordinates. The $N_e$ signal is then sent to signal means 103 where it is combined with a balancing voltage and any error signal is used to drive the $N_e$ servo until the error signal is reduced to zero. Thus there is an $N_e$ signal present on connecting lead 107 and signal producing means 110 is also adjusted in accordance with $N_e$. An E signal from the pitch section 84 of vertical gyro 71 is also supplied to means 110. The $N_e$ signal and E signal are compared and the error signal is used to drive the elevator servo and bridge to a null point. Signal means 67 receives a $\phi$ signal from lead 74, which is multiplied by $N_a$ to prive a product $N_a\phi$ and added to the $N_a$ signal from signal means 47 to give a signal output equal to $M_a - N_a\phi$. This latter signal is sent to signal means 82.

A heading signal $\psi$ is required to position the heading servo, and this $\psi$ signal is developed by multiplying the $\phi$ signal from the roll section 72 of vertical gyro 71 by the pitch rate signal $q$ which is introduced to pitch rate gyro 86: the resulting product $q\phi$ is sent to integrating gyro 91 where it is added to the yaw rate signal $r$ to which the gyro is responsive. The sum $q\phi + r$ is integrated to provide a heading signal. The heading signal $\psi$ theoretically is the integral of the sum of two products, that of yaw rate multiplied by the cosine of $\phi$ and that of pitch rate multiplied by the sine of $\phi$, or of $$\int r \cos \phi + q \sin \phi$$

However, for small angles $r \cos \phi$ is approximately equal to $r$ and $\sin \phi$ is approximately equal to $\phi$, so the approximation $r + q\phi$ can be used in place of $r \cos \phi + q \sin \phi$. The $\psi$ signal which is developed in integrating gyro 91 is sent to heading servo 83 where it is compared with a balance signal existing on signal means 93 and any error signal is used to drive the heading servo to a new position. Signal means 82 is therefore positioned at a value representative of heading or $\psi$ supplied on lead 66: and this signal is multiplied by the $L_a$ signal and the product is added to the $M_a - N_a\phi$ signal supplied on lead 77 to produce a signal equal to the $M_a - N_a\phi + L_a\psi$ which was previously defined as $M_e$. Thus the $M_a$ signal received from seeker 40 has been transformed from one of an aircraft reference to one of an earth reference. The $M_e$ signal is supplied on lead 96 to $M_e$ servo 95 where it is compared with a balance signal which is generated in signal means 97 and any error signal is used to drive the $M_e$ servo to a new position representative of $M_e$. Signal means 100 supplies an output signal $M_e$ on lead 101 and also provides an $M_e$ signal at 102 to be sent to aileron servo and bridge 115. A roll signal is obtained from the roll section 72 of vertical gyro 71 and is sent to aileron servo and bridge 115 on lead 117 and a heading signal $\psi$ from signal means 114 of heading servo 83 is also sent to bridge 115. The three signals are combined with an aileron position signal and thus provide the proper bank angle to keep the aircraft oriented with respect to heading.

FIGURE 3b discloses three transformers 199, 189 and 209 which have their respective primary windings 178, 208 and 219 connected to an alternating voltage source and these transformers supply the excitation voltage for most of the signal producing means employed in the coupler or computer. Generally the signal means show only the secondary windings of the previously mentioned transformers and their connections in the circuits. As the radar receiver or signal seeker 40 receives a pair of signals from the previously described antennas, two signals are developed in seeker 40 which are the direction cosines and are represented by symbols $M_a$ and $N_a$. Seeker 40 provides an $M_a$ signal as shown in FIGURE 3a which is sent to $M_a$ servo as a direct current signal and this direct current signal passes through coupling resistor 142 and connecting lead 143 where it is alternately allowed to pass to the input terminal G of $M_a$ amplifier 30a and grounded by a modulating device or vibrator 145 which grounds the signal through connecting lead 159, contact point 150 and armature 146 of vibrator 145 and lead 152. Whenever an input signal is received on terminal G of $M_a$ amplifier 30a, current flows through winding 165 causing the rotor of motor 139 to be rotated. Rate generator 140 produces a negative feedback signal which is sent to cathode $K_1$ of $M_a$ amplifier 30 to act as a stabilizing or damping signal to prevent hunting of motor generator 141. As motor generator 141 rotates, it rotates the movable contact arms of potentiometers 190, 200, 210 and 221. A balance signal is required to stop the rotation of the motor generator combination 141 at a position representative of the $N_a$ signal, and such a signal is developed on movable contact arm 193: it is of opposite sense to the $M_a$ input signal, and when it becomes of equal magnitude thereto the motor generator 141 ceases to rotate. Thus the position of the movable contact arms of potentiometers 190, 200, 210 and 221 are representative of $M_a$ and determine electrical signals which can be further combined with other signals in the coupler.

To compute the $L_a$ term, a signal representative of $M_a$ is obtained from potentiometer 200 and sent to transformer 50 that produces a signal in each half of the secondary winding 214 of $$\frac{M_a}{2}$$

The polarity of magnitude of such signals is such that when combined with the $M_a$ signal represented by the position of contact arm 212, a signal is developed between contact arm 212 and center tap 219 which is of magnitude $$-\frac{M_a^2}{2}$$

A signal of magnitude 1 is added by secondary winding 217 of transformer 189 and the output signal of $$1-\frac{M_a^2}{2}$$

is sent to secondary winding 297 of transformer 60.

Seeker 40 provides an $N_a$ signal which is sent to $N_a$ amplifier 30b as a direct current signal and is transformed into an alternating current signal through the operation of vibrator 145 which alternately allows the $N_a$ signal to be sent to the amplifier and to be grounded at ground 31. The signal is amplified and causes operation of motor 246 as described above. Motor 246 is directly coupled to rate generator 247 and as rate generator 247 is rotated it supplies a negative feedback signal to cathode $K_1$ of $N_a$ amplifier 30 to prevent hunting or oscillations. As motor generator 245 is rotated, it positions the movable contact arms of potentiometers 274, 284, 295 and 304. A balance signal is produced on movable contact arm 277. The rebalance signal is of opposite sense in reference to the $N_a$ signal and when it becomes of equal value motor generator 245 ceases to rotate. Thus all the previously mentioned potentiometers associated with motor generator 245 are driven to positions representative of $N_a$ to provide electrical signals thereof.

Potentiometer 284 provides an $N_a$ signal to transformer 60 which produces a signal in each half of winding 297

$$\frac{N_a}{2}$$

The $$\frac{N_a}{2}$$

signal of magnitude combined with the $N_a$ signal represented by the position of contact arm 301 to provide a signal equal to $$-\frac{N_a^2}{2}$$

the negative polarity being produced by changing polarities of one of the transformer windings of transformer 60. This is combined with the $$1-\frac{M_a^2}{2}$$

signal described above so that the signal produced on movable contact arm 301 is $$1-\frac{M_a^2}{2}-\frac{N_a^2}{2}$$

which was previously defined as the $L_a$ term.

As the aircraft rotates about its roll axis, a $\phi$ signal is produced on potentiometer 430 of the roll section of vertical gyro 71 shown in FIGURE 3d. This signal is combined with a pitch rate signal $q$ which is developed in pitch rate gyro 86 to produce a product signal on movable contact arm 440 of potentiometer 436 and the $q\phi$ signal is sent to integrating gyro 91. Integrating gyro 91 is positioned so as to detect yaw rate of the aircraft: the yaw rate signal $r$ is algebraically added to the $q\phi$ signal and the combined signal is integrated as a function of time to produce a heading signal $\psi$. The $\psi$ signal is dropped across a voltage divider and added to the rebalance signal appearing between contact arm 456 and the center tap of secondary winding 454 of transformer 199. The rebalance signal is of opposite sense to the $\psi$ signal and any difference between the two signals is sent to the input terminal G of $\psi$ amplifier 30d, causing motor 470 to rotate. As motor 470 rotates, it turns rate generator 471 of motor generator combination 467 to produce a negative feedback signal which is sent to cathode $K_1$ of the input stage of $\psi$ amplifier 30d and this signal is used to prevent oscillations, or act as a damping signal. When motor generator 467 is in a rest position a $\psi$ signal is present on potentiometers 507, 453 and 500.

A second potentiometer 316 (FIGURE 3e) of the roll section of vertical gyro 71 produces a $\phi$ signal which is sent to transformer 223 (FIGURE 3b) thereby developing a pair of $\phi$ signals on secondary windings 231 and 222. Winding 222 is also center tapped and energizes potentiometer 221. A product signal appears between contact arm 225 and center tap 298 and is added to the $N_a$ signal between center tap 298 and ground: the signal present on movable contact arm 225 is $N_a+M_a\phi$ which is added to the output of a bridge made up of potentiometer 331 and resistors 325 and 326 (FIGURE 3e) and energized with the output of secondary winding 327. The $L_a$ term which was developed on movable contact arm 301 of potentiometer 295 is sent to primary winding 312 of transformer 311. To determine the bridge energization the balance of the bridge is modified by the pitch E of the aircraft so that the signal between contact arm 334 and lead 81 is $L_aE$, and that between contact arm 334 and ground is $N_a+M_a\phi-L_aE$ which was previously defined as the $N_e$ term.

The $N_e$ signal is compared to the signal existing on resistive element 337 of potentiometer 335 to provide an error signal and this error signal is sent to the input stage of $N_e$ amplifier 30e. The signal is amplified by $N_e$ amplifier 30e and causes a current flow through control winding 362 to drive motor 360 and simultaneously rotate rate generator 361 of motor generator 357. As rate generator 361 rotates, it produces a negative feedback signal to terminal $K_1$ of the input stage and this signal is used to damp out any hunting of the motor generator. As motor generator 357 rotates it positions the movable contact arms of potentiometers 335 and 384. Thus the $N_e$ signal, when compared with the rebalance signal produced on movable contact arm 340 is reduced to a null value and motor generator 357 is driven to a rest position. The $N_e$ signal on movable contact arm 387 is then compared with pitch signal E which is developed by the aircraft changing its pitch attitude and if the $N_e$ signal is the same as the E signal, an error signal does not exist. However, if the $N_e$ signal and E signal do not agree, an error signal is presented to potentiometer 410. Movable contact arm 412 of potentiometer 410 is varied in accordance with true airspeed in such a manner that as the airspeed increases, a larger signal will be received on movable contact arm 412 and sent to a compensator amplifier 407 which provides a signal to drive motor 406 and drive shafts 423 and 423'.

Shaft 423' positions movable contact arm 413' to a new position and thereby creates an error signal which is compared with an elevator position signal supplied by movable contact arm 425 of potentiometer 424. The difference is sent to the elevator servo which actuates elevator surface 448 away from the streamlined position and simultaneously rebalances the elevator bridge by repositioning movable contact arm 425. The resulting change in attitude causes a change in the relation between the E and $N_e$ signals: the signal sent to compensator amplifier 407 reduces to a null point and will tend to reverse itself in electrical sense and thereby unbalance the elevator bridge in the opposite sense to the operation just described. The signal received by elevator servo 429 is now of opposite sense and causes elevator surface 448 to be actuated towards the streamlined position and this movement simultaneously rebalances the elevator bridge by a movement of movable contact arm 425. Change in the $N_e$ signal as supplied by $N_e$ servo 104 affects the elevator servo in a like manner. It is evident then that the coupler provides a signal to the autopilot such that the aircraft is adjusted in pitch attitude so as to be continuously aligned with the elevation signal as received from the radar ground station.

Movable contact arm 203 of potentiometer 200 shown in FIGURE 3a provides an $M_a$ signal which is sent to winding 231 of transformer 223 (FIGURE 3b) where it is combined with the $N_a\phi$ signal which is developed across winding 231. The $M_a - N_a\phi$ signal appears on movable contact arm 306 and is added to the product signal $L_a\psi$ appearing between contact arm 503 and the center tap on secondary winding 501 of transformer 311 (FIGURE 3d). Transformer secondary winding 501 energizes potentiometer 500 in accordance with $L_a$, and contact arm 503 is adjusted in accordance with $\psi$ to compute the $L_a\psi$ product. The signal between movable contact arm 503 and ground is $M_a\phi - N_a\phi + L_a\psi$ which was previously defined as the $M_e$ term and this signal is compared with the rebalance signal between contact arm 551 and the center tap of winding 547: the difference signal is sent to $M_e$ amplifier 30c as an input signal on terminal G. $M_e$ amplifier 30c amplifies the error signal causing motor 524 and rate generator 525 to be rotated. As rate generator 525 is rotated it develops a negative feedback signal on control winding 543 which is connected to cathode $K_1$ of $M_e$ amplifier 30c to eliminate hunting in the servo system. Movable contact arms 551 and 562 are also driven until they reach a position representative of the $M_e$ signal. The $M_e$ signal present on movable contact arm 562 is dropped across the voltage divider consisting of resistors 566 and 567. The input to roll integrator amplifier 558 is the sum of the voltage between contact arm 512 and the junction point of resistors 566 and 567 added to the voltage between contact arm 582 and the center of winding 572, that is, of $M_e$, $\psi$, and $\phi$. Therefore the $\psi$ signal and $M_e$ signal are instantaneously compared with the $\phi$ signal existing on movable contact arm 582: any error signal that exists is compared with an aileron position signal determined by movable contact arm 576 and the resulting signal is sent to aileron servo 593. Aileron servo 593 positions aileron 596 and rebalances bridge 573 by repositioning movable contact arm 576. Thus the aircraft is placed in a bank and the roll signal is changed due to the movement of movable contact arm 582 of potentiometer 577. The roll rate accompanying this banking of the aircraft acts on integrating gyro 91 to result in a new value of $\psi$ producing a signal at roll integrator 558 of opposite sense, thus causing aileron servo 593 to be rotated in a direction opposite to that previously described. The ailerons 596 are actuated in a direction opposite to that just previously described and are moved towards the streamlined position while simultaneously moving movable contact arm 576 to rebalance aileron bridge 573. This operation continues until the $M_e$ signal and the $\psi$ signal are equal, the net result being that the only two variables in the aileron bridge are the roll signal $\phi$ and the rebalance signal which is obtained at movable contact arm 576.

While I have shown and described a specific embodiment of this invention, the invention should not be limtied to the particular form shown, and I intend in the appended claims to cover all modifications which do not depart from the spirit and scope of the invention.

What we claim is:

1. Apparatus for automatically controlling the course of a dirigible craft with respect to a predetermined reference; first means energized by a first signal representative of a position in space of said dirigible craft for producing a first output signal; first dividing means energized by said first output signal whereby a first quotient signal is produced; first multiplying means energized by said first quotient signal as well as said first output signal from said first means for producing a first product signal; constant-magnitude signal means producing a constant-magnitude signal; first adding means energized by said first product signal and said constant-magnitude signal for producing a first algebraic addition signal; second means energized by a second signal representative of a position in space of said dirigible craft for producing a second output signal; second dividing means energized by said second output signal whereby a second quotient signal is produced; second multiplying means energized by said second quotient signal and said second output signal from said second means for producing a second product signal; and second adding means energized by said second product signal and said first algebraic addition signal for producing a second algebraic addition signal.

2. Apparatus for automatically controlling the course of a dirigible craft with respect to a predetermined reference; first receiver means energized by a first direction cosine signal representative of a position in space of a dirigible craft for producing a first receiver output signal; first dividing means energized by said first receiver output signal whereby a first quotient signal is produced; first multiplying means energized by said first quotient signal as well as said first receiver output signal for producing a first product signal; constant-magnitude signal means for producing a constant-magnitude signal; first adding means energized by said first product signal and said constant-magnitude signal for producing a first algebraic addition signal; second receiver means energized by a second direction cosine signal representative of a position in space of said dirigible craft for producing a second receiver output signal; second dividing means energized by said second receiver output signal whereby a second quotient signal is produced; second multiplying means energized by said second quotient signal and said second receiver output signal for producing a second product signal; and second adding means energized by said second product signal and said first algebraic addition signal for producing a second algebraic addition signal which is the algebraic sum of said constant-magnitude signal, said first product signal, and said second product signal.

3. Apparatus for automatically controlling the course of a dirigible craft with respect to a predetermined reference: first receiver means energized by a first direction cosine signal $M_a$ representative of a position in space of a dirigible craft for producing a first receiver output signal of the mathematical form of $M_a$; first dividing means energized by said first receiver output signal whereby a first quotient signal of the mathematical form of $$-\frac{M_a}{2}$$

is produced; first multiplying means energized by said first quotient signal as well as said first receiver output signal for producing a first product signal of the mathematical form of $$-\frac{M_a^2}{2}$$

constant-magnitude signal means for producing a constant-magnitude signal having a value of unity; first adding means energized by said first product signal and said constant-magnitude signal for producing a first algebraic addition signal of the mathematical form of $$1-\frac{M_a^2}{2}$$

second receiver means energized by a second direction cosine signal $M_a$ representative of said position in space of said dirigible craft for producing a second receiver output signal of the mathematical form of $N_a$; second dividing means energized by said second receiver output signal whereby a second quotient signal of the mathematical form of $$-\frac{N_a^2}{2}$$

is produced; second multiplying means energized by said second quotient signal and said second receiver output signal for producing a second product signal of the mathematical form of $$-\frac{N_a^2}{2}$$

and second adding means energized by said second product signal and said first algebraic addition signal for producing a second algebraic addition signal of the mathematical form of $$1-\frac{M_a^2}{2}-\frac{N_a^2}{2}$$

which is the algebraic sum of said constant-magnitude signal, said first product signal, and said second product signal.

4. Apparatus for automatically controlling the course of a dirigible craft with respect to a predetermined reference, said dirigible craft having a first axis, a second axis, and a third axis: first means energized by a first signal representative of a position in space of said dirigible craft for producing a second position signal; first attitude sensing means including means for producing first and second attitude signals representative of said dirigible craft attitude; computing means for computing a third position signal representative of said position in space of said dirigible craft from said first and second position signals; interconnecting means interconnecting said computing means to said first and second means and to said first attitude sensing means for producing a fourth signal, said fourth signal being determined by the algebraic sum of said second position signal plus the product of said first position multiplied by said first attitude signal minus the product of said third position signal multiplied by said second attitude signal; autopilot means including said first attitude sensing means; third means energized by said fourth signal for producing output signal representative of said dirigible craft attitude error, said third means energizing said autopilot means; second attitude sensing means developing a first rate signal representative of said dirigible craft rate of change about said second axis, said second attitude sensing means being operatively connected to said first attitude sensing means for producing a fifth signal which is determined by the product of said first rate signal multiplied by said first attitude signal; third attitude sensing means developing a second rate signal representative of said dirigible craft rate of change about said third axis; integrating means for integrating the sum of said second rate signal plus said fifth signal as a function of time to produce a sixth signal, said integrating means being connected to said second attitude sensing means and to said third attitude sensing means; fourth means energized by said sixth signal and connected to said autopilot means for producing a heading signal which is representative of the heading of said dirigible craft; and fifth means connected to said first, second, and fourth means, said computing means, and said first attitude sensing means for producing a seventh signal, said seventh signal being determined by the algebraic sum of said first position signal minus the product of said second position signal multiplied by said first attitude signal plus the product of said third position signal multiplied by said heading signal for energizing said autopilot means.

5. Apparatus for automatically controlling the course of a dirigible craft with respect to a predetermined reference, said dirigible craft having a roll axis, a pitch axis, and a yaw axis: first means energized by a first signal representative of a position in space of said dirigible craft, said first control means including means for producing a first position signal; second means energized by a second signal representative of said position in space of said dirigible craft, said second control means including means for producing a second position signal; first attitude sensing means including means for producing roll and pitch signals representative of said dirigible craft roll and pitch, computing means for computing a third position signal representative of said position in space of said dirigible craft from said first and second position signals, said third position signal being of the mathematical form of $$1-\frac{X^2}{2}-\frac{Y^2}{2}$$

where X represents said first position signal and Y represents said second position signal; interconnecting means interconnecting said computing means to said first and second means and to said first attitude sensing means for producing a fourth signal, said fourth signal being determined by the algebraic sum of said second position signal plus the product of said first position signal multiplied by said roll signal minus the product of said third position signal multiplied by said pitch signal; autopilot means including said first attitude sensing means; third means energized by said fourth signal for producing output signals representative of said dirigible craft attitude error, said third means energizing said autopilot means; second attitude sensing means including means for developing a pitch rate signal representative of said dirigible craft rate of change about said pitch axis, said second attitude sensing means being operatively connected to said first attitude sensing means for producing a fifth signal which is determined by the product of said pitch rate signal multiplied by said roll signal; third attitude means including means for developing a yaw rate signal representative of said dirigible craft rate of change about said yaw axis, said third attitude sensing means further including integrating means energized by said yaw rate signal and said fifth signal for integrating the sum of said signals as a function of time to produce a sixth signal; fourth means energized by said sixth signal and connected to said autopilot means for producing a heading signal which is representative of the heading of said dirigible craft; and fifth means connected to said first, second, and fourth means, said computing means, and said first attitude sensing means for producing a seventh signal, said seventh signal being determined by the algebraic sum of said first position signal minus the product of said second position signal multiplied by said roll signal plus the product of said third position signal multiplied by said heading signal for energizing said autopilot means.

6. Apparatus for automatically controlling the course of a dirigible craft with respect to a predetermined reference, said dirigible craft having a roll axis, a pitch axis, and a yaw axis; first control means energized by a first signal representative of a position in space of said dirigible craft, said first control means including means for producing a first position signal; second control means energized by a second signal representative of said position in space of said dirigible craft, said second control means including means for producing a second position signal; first gyroscopic means including means for producing roll and pitch signals representative of said dirigible craft roll and pitch; computing means for computing a third position signal representative of said position in space of said dirigible craft from said first and second position signals, said third position signal being of the mathematical form of $$1 - \frac{X^2}{2} - \frac{Y^2}{2}$$

where X represents said first position signal and Y represents said second position signal; interconnecting means interconnecting said computing means to said first and second control means and to said first gyroscopic means for producing a fourth signal, said fourth signal being determined by the algebraic sum of said second position signal plus the product of said first position signal multiplied by said roll signal minus the product of said third position signal multiplied by said pitch signal; autopilot means including first gyroscopic means; third control means energized by said fourth signal for producing first signals representative of said dirigible craft attitude erro, said third control means energizing said auto pilot means; second gyroscopic means including means for developing a pitch rate signal representative of said dirigible craft rate of change about said pitch axis, said second gyroscopic means for producing a fifth signal which is determined by the product of said pitch rate signal multiplied by said roll signal; third gyroscopic means including means for developing a yaw rate signal representative of said dirigible craft rate of change about said yaw axis, said third gyroscopic means further including integrating means energized by said yaw rate signal and said fifth signal for integrating the sum of said signals as a function of time to produce a sixth signal; fourth control means energized by said sixth signal and connected to said autopilot means for producing a heading signal which is representative of the heading of said dirigible craft; and fifth control means connected to said first, second, and fourth control means, said computing means, and said first gyroscopic means for producing a seventh signal, said seventh signal being determined by the algebraic sum of said first position signal minus the product of said second position signal multiplied by said roll signal plus the product of said third position signal multiplied by said heading signal for energizing said autopilot means.

7. Apparatus for automatically controlling the course of a dirigible craft with respect to a predetermined reference, said dirigible craft having a roll axis, a pitch axis, and a yaw axis: first control means energized by a first signal representative of a position in space of said dirigible craft, said first control means including means for producing a first position signal; second control means energized by a second signal representative of said position in space of said dirigible craft, said second control means including means for producing a second position signal; first gyroscopic means including means for producing roll and pitch signals representative of said dirigible craft roll and pitch; computing means for computing a third position signal representative of said position in space of said dirigible craft from said first and second position signals, said third position signal being of the mathematical form of $$1 - \frac{X^2}{2} - \frac{Y^2}{2}$$

where X represents said first position signal and Y represents said second position signal; means connecting said computing means to said first and second control means and to said first gyroscopic means for producing a fourth signal, said fourth signal being determined by the algebraic sum of said second position signal plus the product of said first position signal multiplied by said roll signal minus the product of said third position signal multiplied by said pitch signal; autopilot means including said first gyroscopic means, an elevator channel, and an aileron channel; third control means energized by said fourth signal for producing output signals representative of said dirigible craft attitude error, said third control means energizing said elevator channel of said autopilot means; second gyroscopic means including means for developing a pitch rate signal representative of said dirigible craft rate of change about said pitch axis, said second gyroscopic means being operatively connected to said first gyroscopic means for producing a fifth signal which is determined by the product of said pitch rate signal multiplied by said roll signal; third gyroscopic means including means for developing a yaw rate signal representative of said dirigible craft rate of change about said yaw axis, said third gyroscopic means further including integrating means energized by said yaw rate signal and said fifth signal for integrating the sum of said signals as a function of time to produce a sixth signal; fourth control means energized by said sixth signal and connected to said autopilot means for producing a heading signal which is representative of the heading of said dirigible craft; and fifth control means connected to said first, second, and fourth control means, said computing means, and said first gyroscopic means for producing a seventh signal, said seventh signal being determined by the algebraic sum of said first position signal minus the product of said second position signal multiplied by said roll signal plus the product of said third position signal multiplied by said heading signal for energizing said aileron channel of said autopilot means.

8. Control apparatus for a dirigible craft comprising: means for producing a first signal representative of a position in space of said craft with respect to a predetermined reference; first computing means controlled by said first signal to produce a second signal proportional to a selected fraction of said first signal; second computing means controlled by said first and second signals to product a third signal proportional to the product of said first and second signals; means for producing a fourth signal of constant magnitude; third computing means controlled by said third and fourth signals to produce a fifth signal proportional to the algebraic sum of said fourth and fifth signals; means for producing a sixth signal representative of said position in space of said craft with respect to said reference; fourth computing means controlled by said sixth signal to produce a seventh signal proportional to a selected fraction of said sixth signal; fifth computing means controlled by said sixth and seventh signals to produce an eighth signal proportional to the product of said sixth and seventh signals; sixth computing means controlled by said fifth and eighth signals to produce a ninth signal proportional to the algebraic sum of said fifth and eighth signals; and means controlled in accordance with said signals for automatically controlling the course of said craft with respect to said reference.

9. Control apparatus for a dirigible craft comprising: means for producing a first signal representative of a position in space of said craft with respect to a predetermined reference; first computing means controlled by said first signal to produce a second signal proportional to a selected fraction of an exponential function of said first signal; means for producing a third signal of constant magnitude; means for producing a fourth signal representative of said position in space of said craft with respect to said reference; second computing means controlled by said fourth signal to produce a fifth signal proportional to a selected fraction of an exponential function of said fourth signal; third computing means controlled by said second, third and fifth signals to produce a sixth signal proportional to the algebraic sum of said second, third and fifth signals; and means controlled in accordance with said signals for automatically controlling the course of said craft with respect to said reference.

10. Control apparatus for a dirigible craft comprising means for producing a first signal representative of a position in space of said craft with respect to a predetermined reference; first computing means controlled by said first signal to produce a second signal proportional to an exponential function of said first signal; means for producing a third signal of constant magnitude; means for producing a fourth signal representative of said position in space of said craft with respect to said reference; second computing means controlled by said fourth signal to produce a fifth signal proportional to an exponential function of said fourth signal; third computing means controlled by said second, third and fifth signals to produce a sixth signal proportional to the algebraic sum of said second, third, and fifth signals; means including fourth computing means controlled by said second, third and sixth signals to produce a plurality of signals representative of the position of said craft with respect to a second predetermined reference; and means controlled by said plurality of signals for automatically controlling the course of said craft with respect to said second reference.

11. Control apparatus for a dirigible craft, comprising: means for producing a first signal representative of a direction cosine of the line between said craft and a predetermined reference; first computing means controlled by said first signal to produce a second signal proportional to half of an exponential function of said first signal; means for producing a third signal of constant magnitude; means for producing a fourth signal representative of a second direction cosine of the line between said craft and said reference; second computing means controlled by said fourth signal to produce a fifth signal proportional to a sub-multiple of an exponential function of said fourth signal; third computing means controlled by said second, third and fifth signals to produce a sixth signal proportional to the algebraic sum of said second, third and fifth signals, said sixth signal approximating the third direction cosine of the line between said craft and said reference.

12. Control apparatus for a dirigible craft, as claimed in claim 11, additionally comprising: means controlled by said direction cosine signals for automatically controlling said craft.

13. Control apparatus for a dirigible craft comprising: means for producing a first signal representative of a direction cosine of the line between said craft and a predetermined reference; first computing means controlled by said first signal to produce a second signal proportional to an exponential function of said first signal; means for producing a third signal of constant magnitude; means for producing a fourth signal representative of a second direction cosine of the line between said craft and said reference; second computing means controlled by said fourth signal to produce a fifth signal proportional to an exponential function of said fourth signal; third computing means controlled by said second, third and fifth signals to produce a sixth signal proportional to the algebraic sum of said second, third and fifth signals, said sixth signal approximating the third direction cosine of the line between said craft and said reference; means including fourth computing means for transforming said three direction cosine signals into three direction cosine signals related to a second reference; and means controlled by said last mentioned direction cosine signals for automatically controlling the course of said craft with respect to said second reference.

14. In combination: means supplying first and second signals representative of two direction cosines of the location of an external point relative to a set of aircraft coordinates having known orientation with respect to a set of earth coordinates; first computing means deriving from said signals a third signal substantially representative of the third direction cosine of said location relative to said aircraft coordinates; second computing means deriving from said signals a pair of further signals representative of two direction cosines of said location relative to said earth coordinates; and means connected to receive said further signals for controlling an aircraft in accordance therewith.

References Cited in the file of this patent

UNITED STATES PATENTS

| | | |
|---|---|---|
| 2,671,621 | Schuck | Mar. 9, 1954 |
| 2,776,099 | Ferrill | Jan. 1, 1957 |
| 2,794,594 | Ergen et al. | June 4, 1957 |
| 2,801,051 | Perkins | July 30, 1957 |
| 2,906,916 | Palmer | Sept. 29, 1959 |
| 2,927,751 | Daspit | Mar. 8, 1960 |